United States Patent
Andre et al.

(10) Patent No.: US 9,737,808 B2
(45) Date of Patent: Aug. 22, 2017

(54) INFORMATION PROCESSING APPARATUS, INFORMATION PROCESSING METHOD, PROGRAM, AND TOY SYSTEM

(71) Applicant: SONY CORPORATION, Minato-ku (JP)

(72) Inventors: Alexis Andre, Tokyo (JP); Akichika Tanaka, Kanagawa (JP); Yasuhiro Takeda, Tokyo (JP); Tetsu Natsume, Chiba (JP); Kenichi Okada, Tokyo (JP); Takatoshi Nakamura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 236 days.

(21) Appl. No.: 14/386,080

(22) PCT Filed: Mar. 7, 2013

(86) PCT No.: PCT/JP2013/056303
§ 371 (c)(1),
(2) Date: Sep. 18, 2014

(87) PCT Pub. No.: WO2013/183328
PCT Pub. Date: Dec. 12, 2013

(65) Prior Publication Data
US 2015/0080125 A1      Mar. 19, 2015

(30) Foreign Application Priority Data

Jun. 5, 2012   (JP) ................................ 2012-127794
Sep. 3, 2012   (JP) ................................ 2012-193355

(51) Int. Cl.
*A63F 9/24*         (2006.01)
*A63F 13/00*        (2014.01)
(Continued)

(52) U.S. Cl.
CPC .......... *A63F 13/45* (2014.09); *A63F 3/00075* (2013.01); *A63F 3/00643* (2013.01);
(Continued)

(58) Field of Classification Search
CPC .......... A63F 13/45; A63F 13/53; A63F 13/55; A63F 13/56
See application file for complete search history.

(56) References Cited

U.S. PATENT DOCUMENTS 8,475,284 B1*   7/2013   Rudi .................... A63F 13/5258
                                                         463/42
2005/0186884 A1*  8/2005  Evans .................... A63H 17/14
                                                         446/456

(Continued)

FOREIGN PATENT DOCUMENTS

JP        08-215416 A       8/1996
JP        2004-105631 A     4/2004
(Continued)

OTHER PUBLICATIONS

Mechanized Brick, "MB Tiger I," https://web.archive.org/web/20091104103910/http://mechanizedbrick.com/tiger.html, Nov. 4, 2009.*

(Continued)

*Primary Examiner* — Kevin Y Kim
(74) *Attorney, Agent, or Firm* — Chip Law Group

(57) ABSTRACT

There is provided an information processing apparatus including an attribute management unit configured to manage a variable attribute value associated with each one or more characters existing in a real space, a detection unit configured to detect an interaction event between a first character and a real object by using an image captured by a camera that captures the real space, and a setting unit configured to set a rule for changing the attribute value of the (Continued)

first character depending on the interaction event. In a case where the detection unit has detected the interaction event, the attribute management unit changes the attribute value of the first character in accordance with the rule set by the setting unit.

20 Claims, 29 Drawing Sheets

(51) Int. Cl.
    *G06F 17/00*     (2006.01)
    *G06F 19/00*     (2011.01)
    *A63F 13/45*     (2014.01)
    *A63F 13/213*     (2014.01)
    *A63H 33/04*     (2006.01)
    *A63H 3/16*     (2006.01)
    *A63H 3/50*     (2006.01)
    *A63F 13/5375*     (2014.01)
    *A63F 13/58*     (2014.01)
    *A63F 3/00*     (2006.01)

(52) U.S. Cl.
    CPC ............ *A63F 13/213* (2014.09); *A63H 3/16* (2013.01); *A63H 3/50* (2013.01); *A63H 33/042* (2013.01); *A63F 13/5375* (2014.09); *A63F 13/58* (2014.09); *A63F 2003/00583* (2013.01); *A63F 2003/00646* (2013.01); *A63F 2003/00662* (2013.01); *A63F 2003/00678* (2013.01); *A63F 2300/1093* (2013.01); *A63F 2300/69* (2013.01)

(56) References Cited

U.S. PATENT DOCUMENTS

| | | |
|---|---|---|
| 2010/0093255 A1 | 4/2010 | Yamamoto |
| 2010/0178966 A1 | 7/2010 | Seydoux |
| 2011/0319148 A1* | 12/2011 | Kinnebrew .......... A63F 13/216 463/1 |

FOREIGN PATENT DOCUMENTS

| | | |
|---|---|---|
| JP | 2010-518354 A | 5/2010 |
| WO | WO 2008/081902 A1 | 7/2008 |

OTHER PUBLICATIONS

International Search Report issued May 28, 2013 in PCT/JP2013/056303.

* cited by examiner

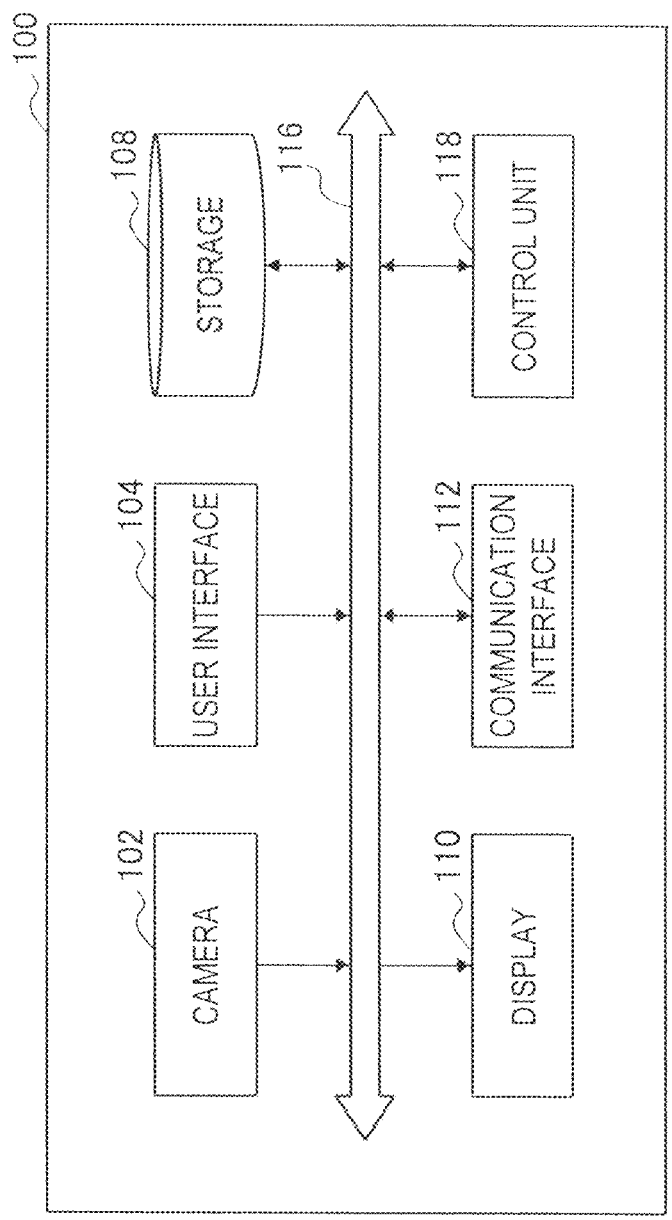

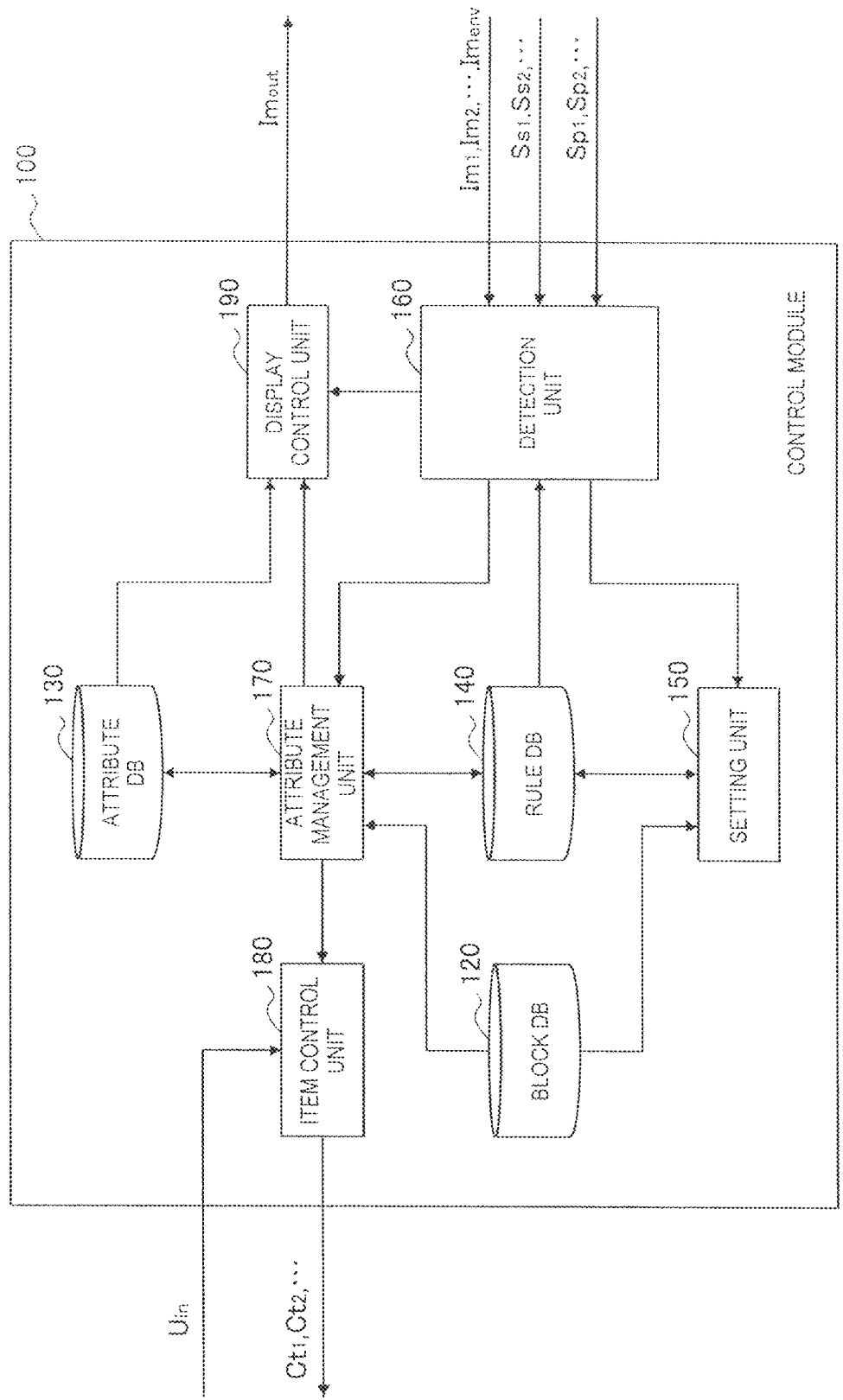

FIG.8

| BLOCK ID | TYPE | NAME | APPEARANCE | ACTION PATTERN |
|---|---|---|---|---|
| M11 | HEAD | CHARACTER X | ... | ·SOUND OUTPUT<br>·LIGHT EMISSION |
| M21 | HEAD | CHARACTER Y | ... | ·SOUND OUTPUT<br>·LIGHT EMISSION |
| M12 | BODY | BODY A | ... | ·ROTATION OF RIGHT ARM<br>·ROTATION OF LEFT ARM<br>·ROTATION OF WAIST<br>·WALKING |
| M13 | ACCESSORY | HELMET A | ... | N/A |
| M14 | WEAPON | SABER A | ... | N/A |
| M24 | REMOTE-ATTACK WEAPON | RIFLE B | ... | ·SOUND OUTPUT |
| M31 | BASE | PLAIN | ... | N/A |
| M32 | FIELD BLOCK | PLANT | ... | ·SEED DROP |
| M33 | FIELD BLOCK | SPRING | ... | N/A |
| ... | ... | ... | ... | ... |

BLOCK DATA

| HEAD BLOCK ID | CHARACTER ID | LIFE |
|---|---|---|
| M11 | Ch1 | 3 |
| M21 | Ch2 | 2 |
| : | : | : |

ATTRIBUTE DATA

| HEAD BLOCK ID | CHARACTER ID | DISPLAY NAME | HEALTH POINTS | MAXIMUM HEALTH POINTS |
|---|---|---|---|---|
| M11 | Ch1 | LUKE | 90 | 100 |
| M21 | Ch2 | HARRY | 80 | 120 |
| M51 | Ch3 | INDY | 80 | 80 |
| : | : | : | : | : |

ATTRIBUTE DATA

| MAIN BLOCK ID | TYPE | CONNECTION BLOCK |
|---|---|---|
| M11 | CHARACTER | M12 |
| | | M13 |
| | | M14 |
| M21 | CHARACTER | M22 |
| | | M23 |
| | | M24 |
| M31 | FIELD | M32 |
| : | : | : |

BLOCK CONFIGURATION DATA

| PARTY ID | DISPLAY NAME | MEMBER |
|---|---|---|
| P1 | EARTH ARMY | Ch1 |
| | | Ch3 |
| P2 | MARS ARMY | Ch2 |
| | | : |
| : | : | : |

PARTY DATA

INTERACTION RULE

| INVOLVEMENT OBJECT | INVOLVEMENT BLOCK | TYPE | ATTRIBUTE CHANGE |
|---|---|---|---|
| M14 | M21 | DIRECT ATTACK | $-X_1$ |
|  | M22 |  |  |
| M24 | M11 | REMOTE ATTACK | $-X_2$ |
|  | M12 |  |  |
| M32 | M11 | DAMAGE | $-X_3$ |
|  | M21 |  |  |
| M33 | M12 | RESTORATION | $+X_4$ |
|  | M22 |  |  |
| M31 | M12 | ACCIDENT | $-X_5$ (FALLING STATE ONLY) |
|  | M22 |  |  |
| USER BODY | M11 | DAMAGE | $-X_6$ |
|  | M12 |  |  |
|  | M21 |  |  |
|  | M22 |  |  |
| GENERAL OBJECT | M11 | DAMAGE | $-X_7$ |
|  | M12 |  |  |
|  | M21 |  |  |
|  | M22 |  |  |
| ⋮ | ⋮ | ⋮ | ⋮ |

INTERACTION RULE

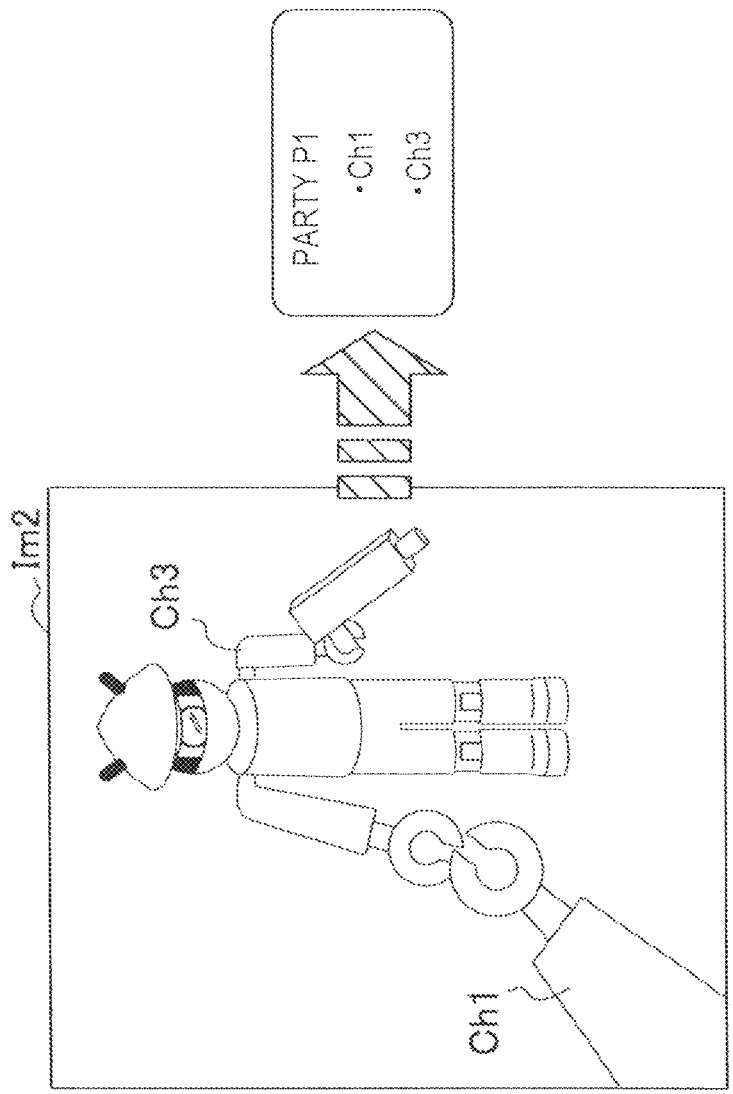

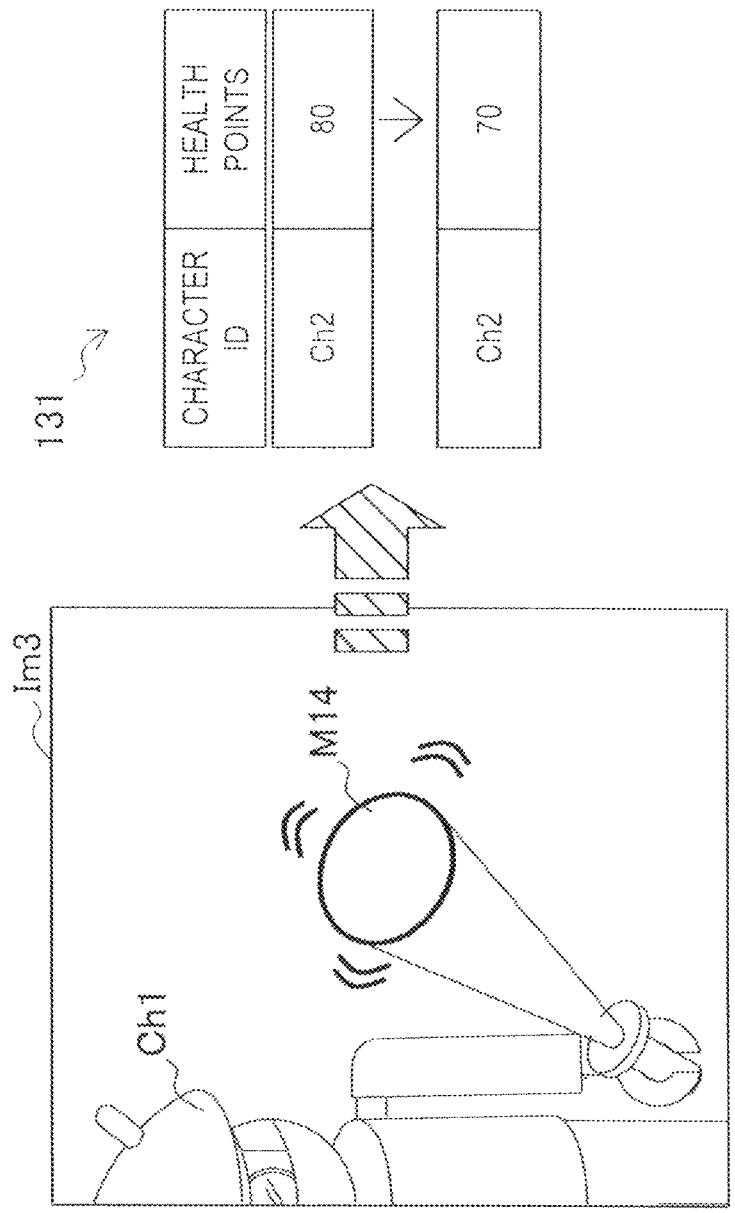

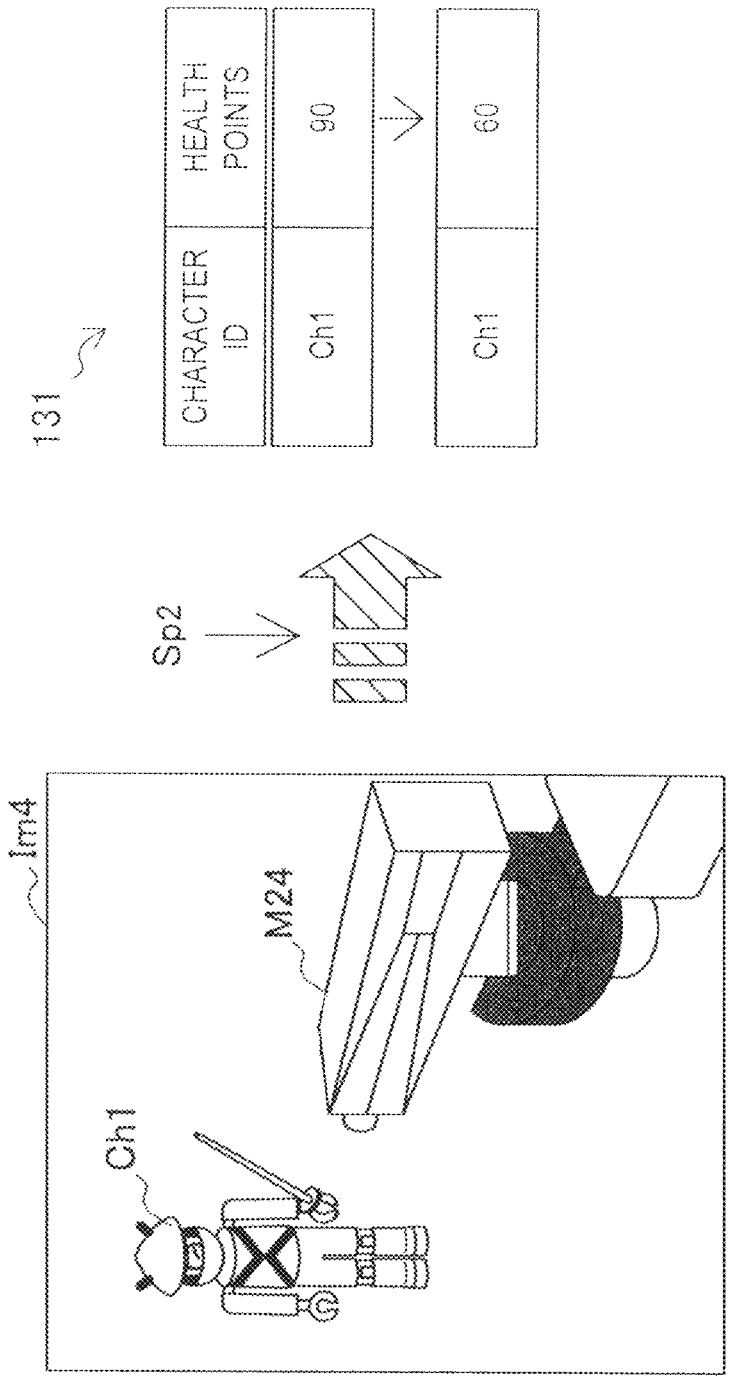

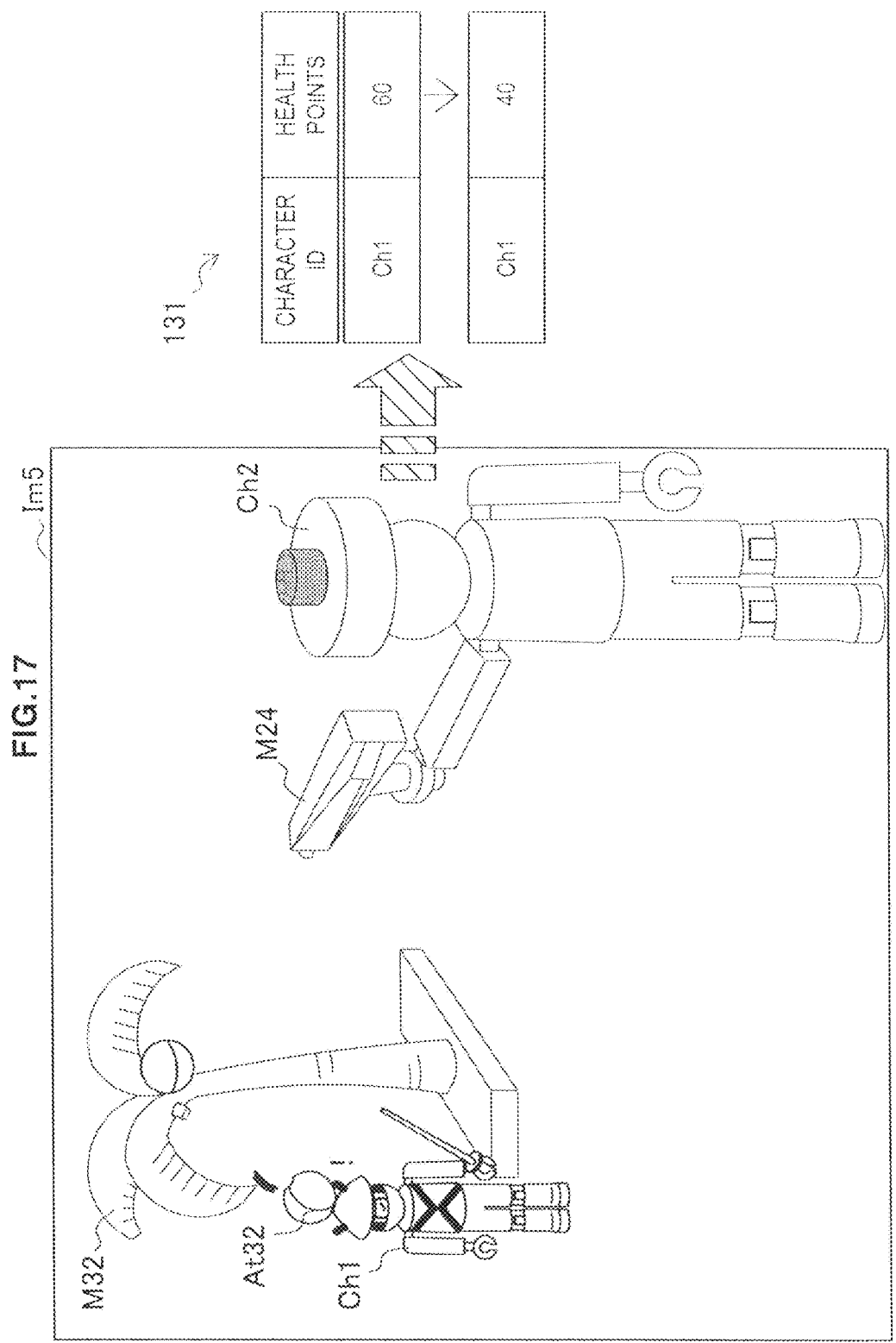

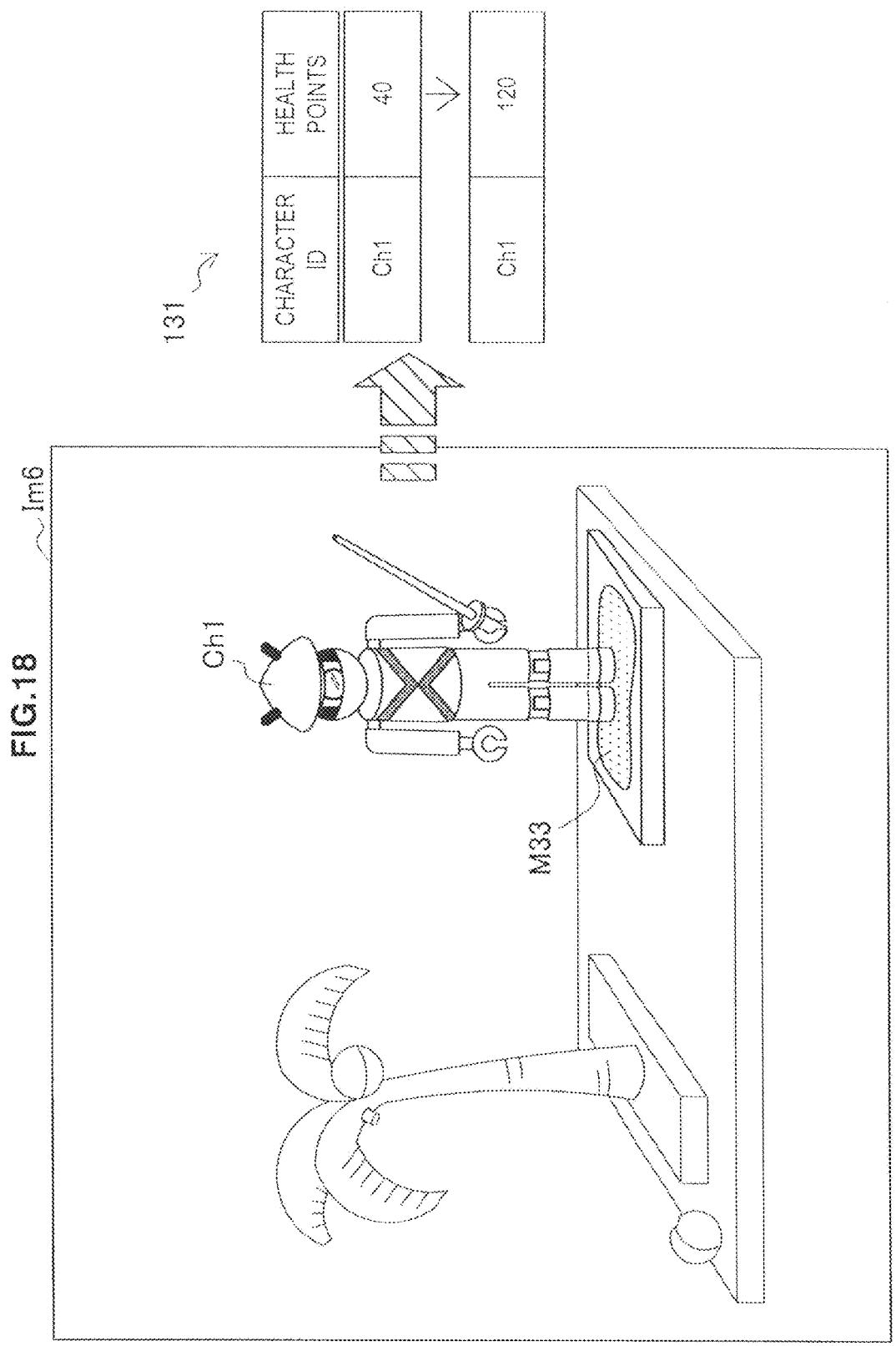

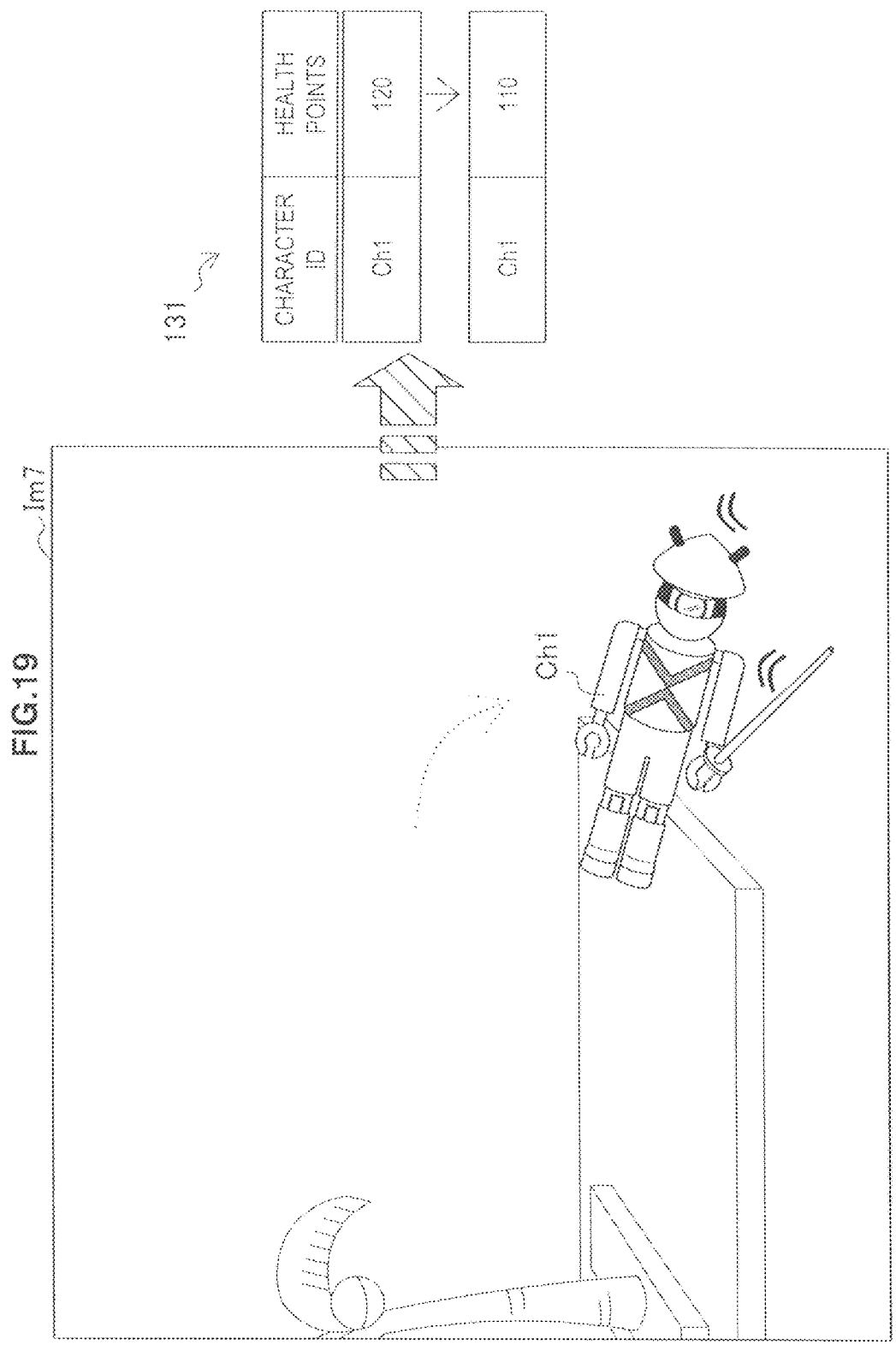

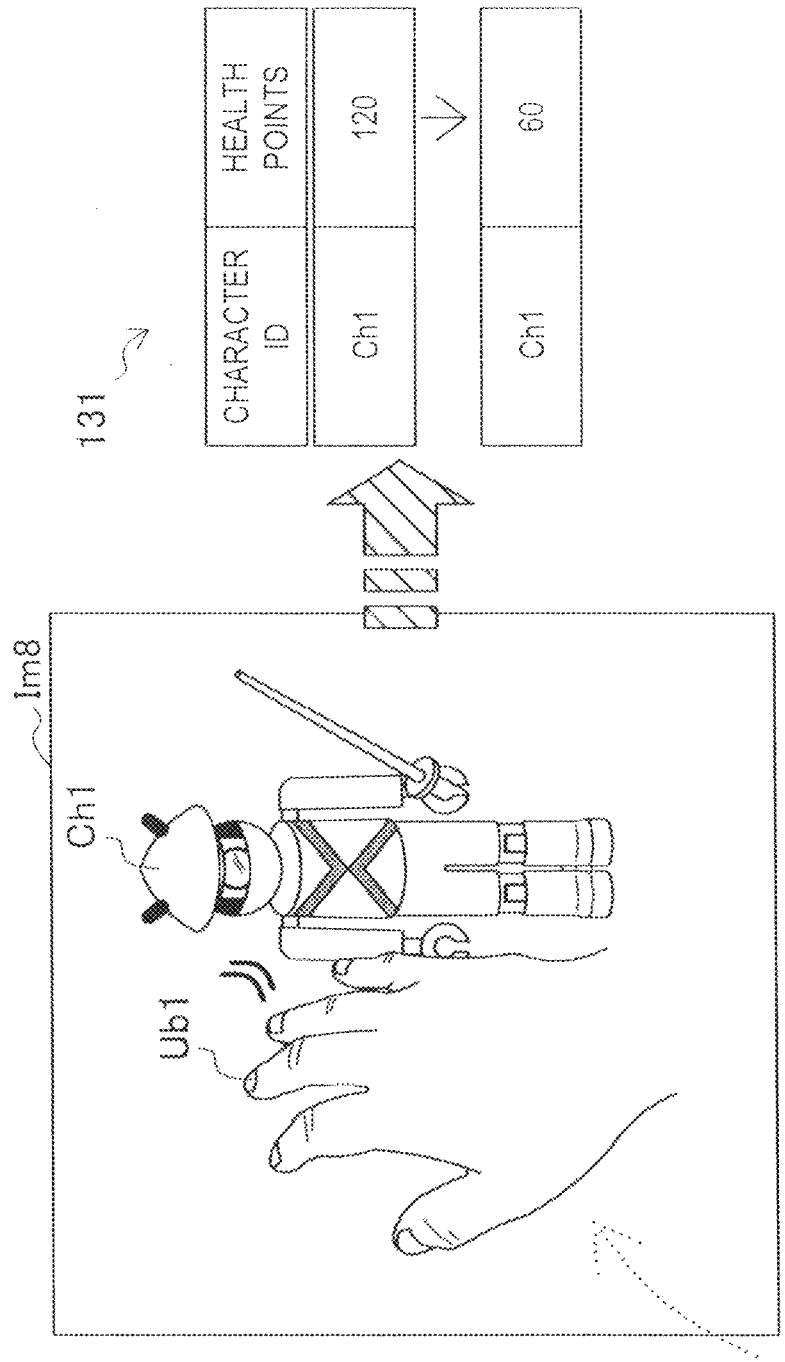

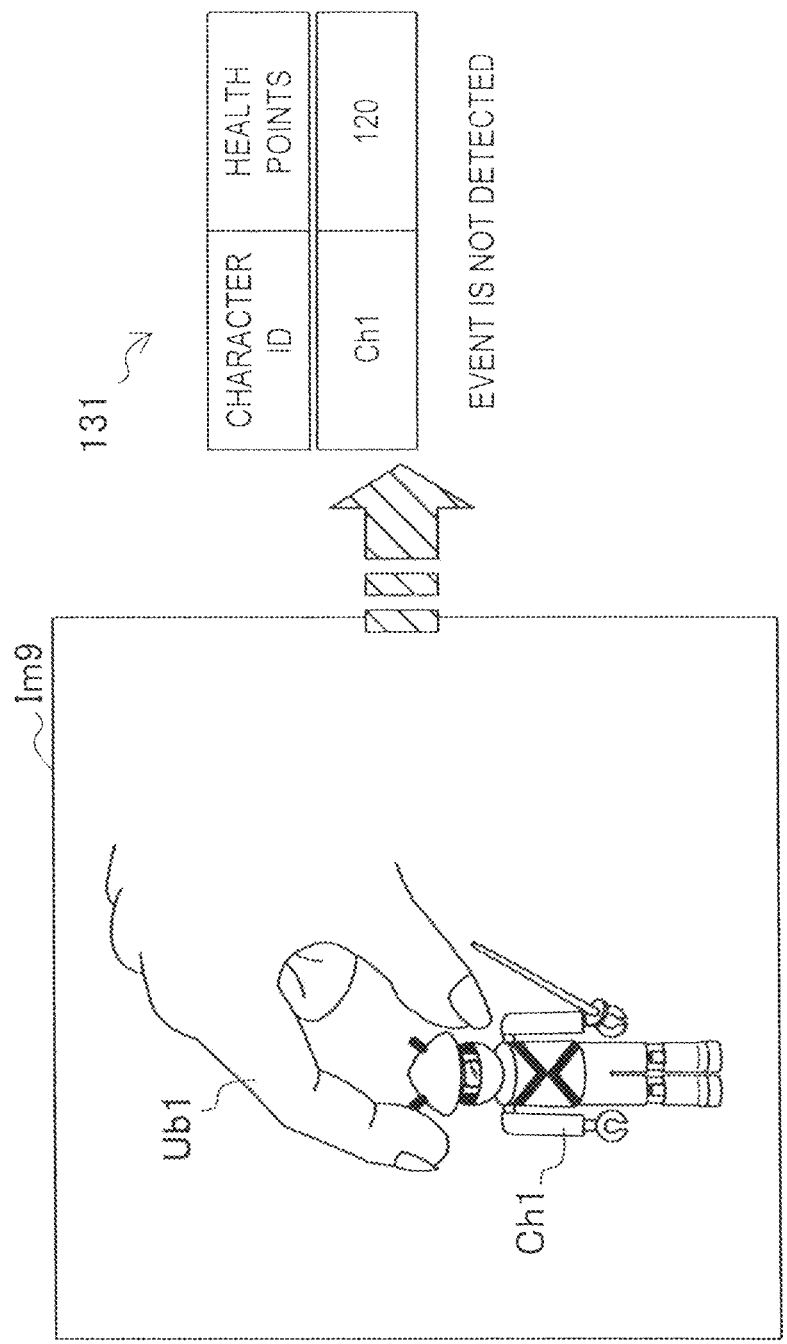

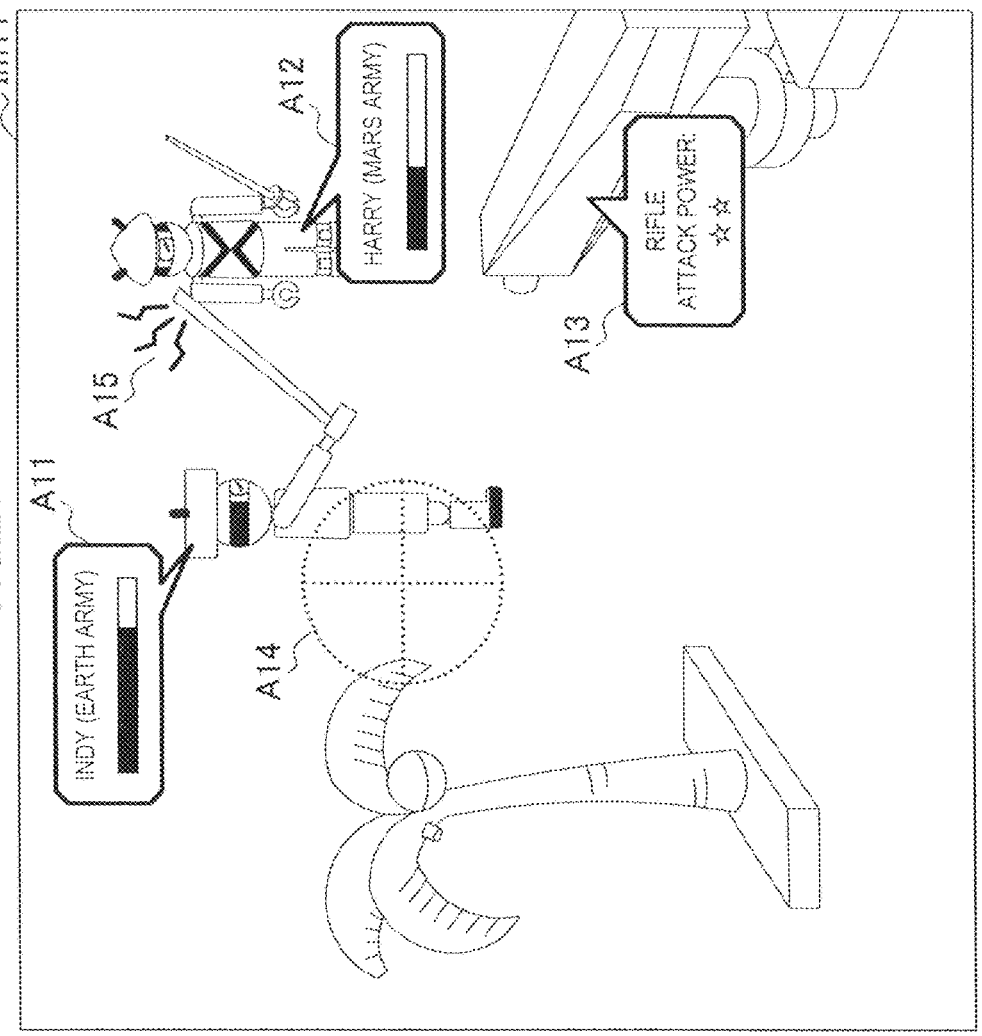

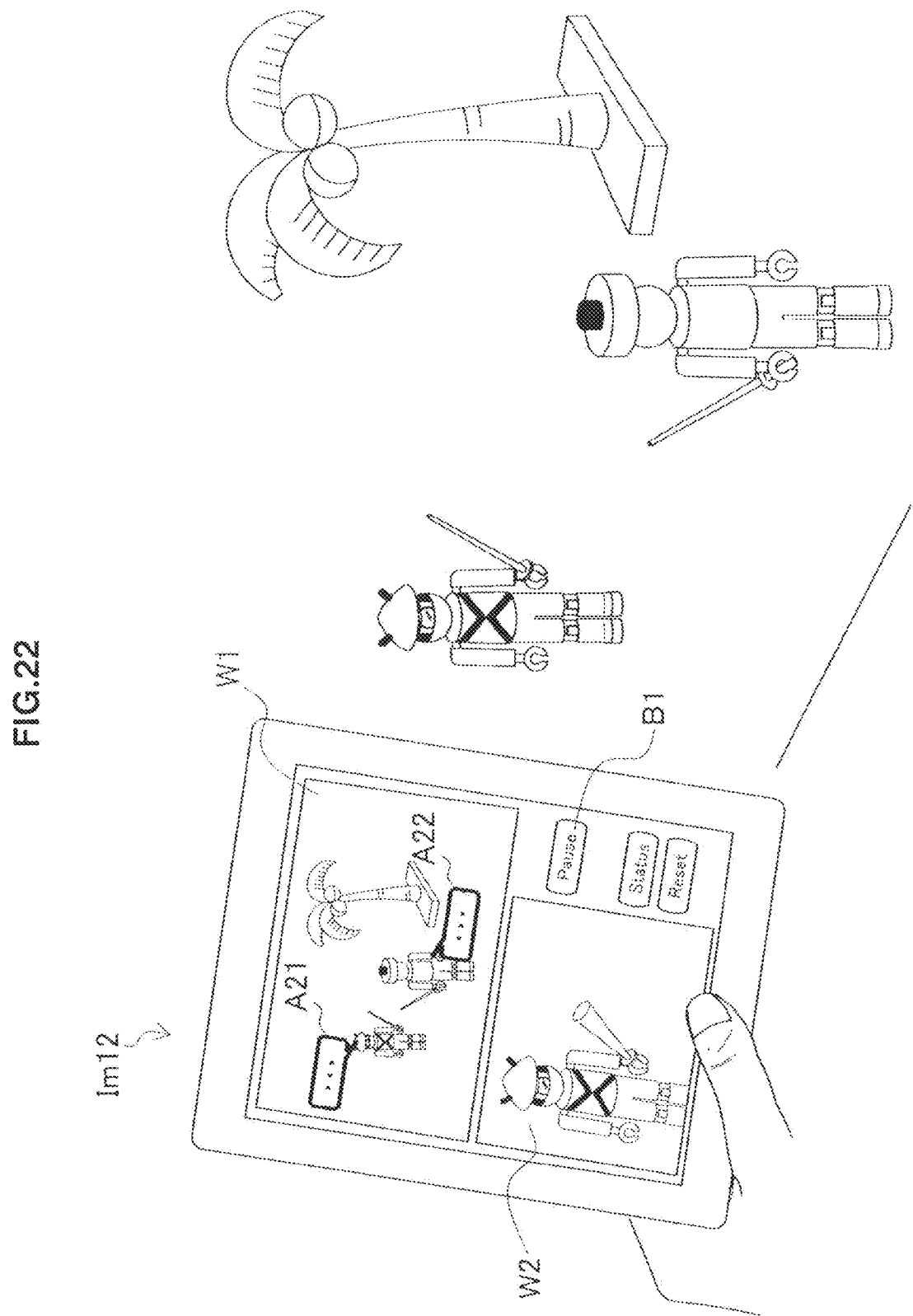

INFORMATION PROCESSING APPARATUS, INFORMATION PROCESSING METHOD, PROGRAM, AND TOY SYSTEM

TECHNICAL FIELD

The present disclosure relates to an information processing apparatus, an information processing method, a program, and a toy system.

BACKGROUND ART

In the related art, there has been known a game or hobby to enjoy a battle between a plurality of robots operated in a real space. The battle includes various forms such as a fight, wrestling, and a sports game.

Patent Literature 1 proposes a technology of determining success or failure of a remote attack in a battle between robots by using an image from a camera installed in an offensive robot.

CITATION LIST

Patent Literature

Patent Literature 1: JP H08-215416A

SUMMARY OF INVENTION

Technical Problem

However, in the existing technologies, users can enjoy battles only within ranges of a rule and an environment that has been assumed by developers of battle systems.

In order to enhance attractiveness as the game or the hobby, it is desirable that the battles have flexible conditions and users in a wide age range enjoy the battles.

Solution to Problem

According to the present disclosure, there is provided an information processing apparatus including an attribute management unit configured to manage a variable attribute value associated with each one or more characters existing in a real space, a detection unit configured to detect an interaction event between a first character and a real object by using an image captured by a camera that captures the real space, and a setting unit configured to set a rule for changing the attribute value of the first character depending on the interaction event. In a case where the detection unit has detected the interaction event, the attribute management unit changes the attribute value of the first character in accordance with the rule set by the setting unit.

According to the present disclosure, there is provided an information processing method executed by a computer that controls a system for a battle in which one or more characters existing in a real space participate, the method including setting a rule for changing a variable attribute value which is associated with a first character depending on an interaction event between the first character and a real object, detecting the interaction event by using an image captured by a camera that captures the real space, and changing the attribute value of the first character in accordance with the set rule in a case where the interaction event has been detected.

According to the present disclosure, there is provided a program for causing a computer that controls a system for a battle in which one or more characters existing in a real space participate, to function as an attribute management unit configured to manage a variable attribute value associated with each of the one or more characters, a detection unit configured to detect an interaction event between a first character and a real object by using an image captured by a camera that captures the real space, and a setting unit configured to set a rule for changing the attribute value of the first character depending on the interaction event. In a case where the detection unit has detected the interaction event, the attribute management unit changes the attribute value of the first character in accordance with the rule set by the setting unit.

According to the present disclosure, there is provided a toy system including housings of one or more characters each of which is formed by assembling modularized blocks, and a control module configured to manage a variable attribute value associated with each of the one or more characters. The control module detects an interaction event between a first character and a real object by using an image captured by a camera that captures a real space, and the control module changes the attribute value of the first character in accordance with a rule that is different depending on a kind of a modularized block involved in the interaction event.

Advantageous Effects of Invention

According to technologies according to the present disclosure, it is possible for users in a wide age range to enjoy battles between characters existing in a real space.

BRIEF DESCRIPTION OF DRAWINGS

FIG. 6 is an explanatory diagram illustrating an example of a hardware configuration of an information processing apparatus.

FIG. 7 is an explanatory diagram illustrating an example of a functional configuration of a control module.

FIG. 8 is an explanatory diagram illustrating an example of a configuration of block data.

FIG. 9A is an explanatory diagram illustrating a first example of a configuration of attribute data.

FIG. 9B is an explanatory diagram illustrating a second example of a configuration of attribute data.

FIG. 10 is an explanatory diagram illustrating an example of a configuration of block configuration data.

FIG. 11 is an explanatory diagram illustrating an example of a configuration of party data.

FIG. 12B is an explanatory diagram illustrating a second example of a configuration of an interaction rule.

FIG. 14 is an explanatory diagram illustrating a second technique of setting a party of a character.

FIG. 15 is an explanatory diagram illustrating a first example of change of an attribute value depending on an interaction event.

FIG. 16 is an explanatory diagram illustrating a second example of change of an attribute value depending on an interaction event.

FIG. 17 is an explanatory diagram illustrating a third example of change of an attribute value depending on an interaction event.

FIG. 18 is an explanatory diagram illustrating a fourth example of change of an attribute value depending on an interaction event.

FIG. 19 is an explanatory diagram illustrating a fifth example of change of an attribute value depending on an interaction event.

FIG. 20A is an explanatory diagram illustrating a sixth example of change of an attribute value depending on an interaction event.

FIG. 20B is an explanatory diagram illustrating an exception to an interaction event in which a body of a user is involved.

FIG. 21 is an explanatory diagram illustrating a first example of an image that may be displayed in an embodiment.

FIG. 22 is an explanatory diagram illustrating a second example of an image that may be displayed in an embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that the description is given in the following order.
1. Overview of System
2. Configuration Example of Item
2-1. Housing of Character
2-2. Field Item
2-3. Hardware in Character
2-4. Hardware of Information Processing Apparatus
3. Functional Configuration Example
3-1. Block DB
3-2. Attribute DB
3-3. Rule DB
3-4. Setting Unit
3-5. Detection Unit
3-6. Attribute Management Unit
3-7. Item Control Unit
3-8. Display Control Unit
4. Flow of Processing
5. Diverse Blocks
6. Conclusion <1. Overview of System>

Figure 1:
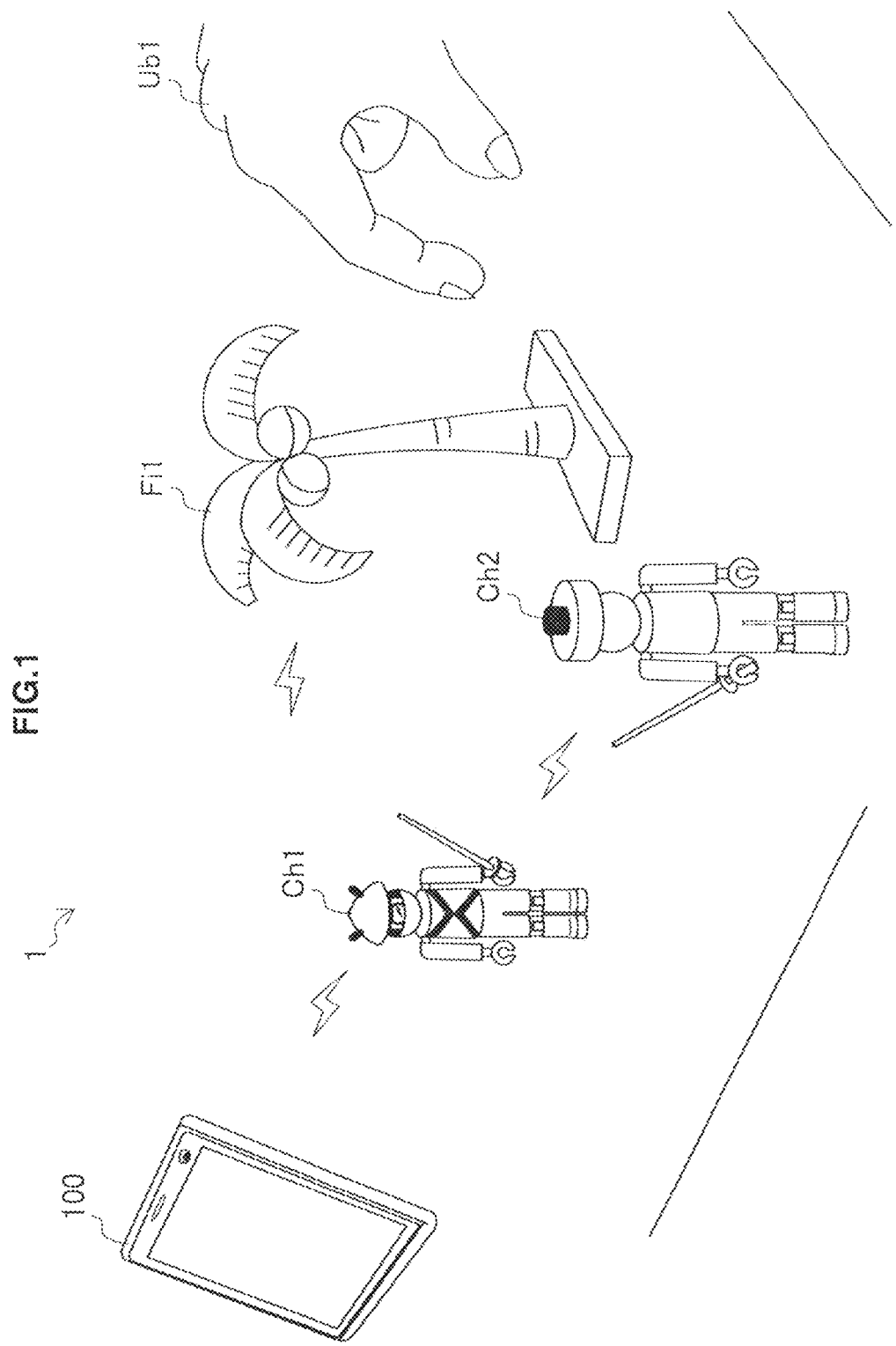
FIG. 1 is an explanatory diagram illustrating an overview of a toy system according to an embodiment.

First, an overview of a toy system according to an embodiment is explained. FIG. 1 is an explanatory diagram illustrating an overview of a toy system 1 according to an embodiment. The toy system 1 includes one or more characters existing in a real space. FIG. 1 shows two characters Ch1 and Ch2. In the present specification, the characters are real objects that are subjects of a battle. A variable attribute value is associated with each of the characters, the attribute value being used for determining winning or losing of the battle. In FIG. 1, humanoid characters are displayed as an example. However, the characters may be other types (for example, animal type). In addition, the toy system 1 may include another item than the characters. Diverse kinds of items may be possible. In FIG. 1, a field item Fi1 which constitutes a battle field is shown. Each of the characters includes a communication interface and communicates with a control module. The field item may also communicate with the control module. The control module is installed in an information processing apparatus 100 for example. The control module controls a battle in the toy system 1.

In the present embodiment, the battle progresses depending on diverse events that may occur in the real space in accordance with a dynamically set rule. The rule is also set depending on the events that may occur in the real space. In the present specification, an event detected for progressing the battle is referred to as an interaction event. In addition, an event detected for setting the rule is referred to as a rule event. For example, the rule may include which character participates in the battle, which characters have an adversarial (or amicable) relationship with each other, what kind of event is detected as the interaction event, or how attribute values of the characters are changed depending on the interaction event.

The event is typically detected using an image captured by a camera. Additionally (or alternatively), input data from a sensor or a microphone that are provided in a character or a field may be used for detecting the event. In the present embodiment, a camera (hereinafter, referred to as character camera) from a viewpoint of each character is installed in a head of each character. In addition, as an option, a camera (hereinafter, referred to as field camera) that looks down a whole field may be provided outside of the housing of the character. A camera included in the information processing apparatus 100 may be used as the field camera. In an image captured by the character camera or the field camera, a user body Ub1 may also be shown, the user enjoying the battle.

Each character includes an actuator and operates as a so-called robot. In addition, each character moves depending on an instruction from a user, moves autonomously, or executes action for an attack. The actuator may also be driven so as to express reaction depending on interaction events.

In the present embodiment, a condition of a battle may be flexibly changed. Even in the middle of the battle, it is allowed to change a character configuration, to change the adversarial relationship, and to add a new item to the field. In order to be able to flexibly change a condition of the battle, each character is formed by assembling modularized blocks. By changing assembly of the blocks, the user can enjoy the battle under diverse conditions. A battle field or an item other than the characters may also be formed by assembling modularized blocks. In the present embodiment, it is also possible that a real object (including the user body) which is not included in the toy system 1 is involved in an interaction event. Such involvement may contribute to diversity of battle conditions. In the following sections, configuration examples of each element of such toy system 1 are explained in detail.

<2. Configuration Example of Item>
<2-1. Housing of Character>

Figure 2:
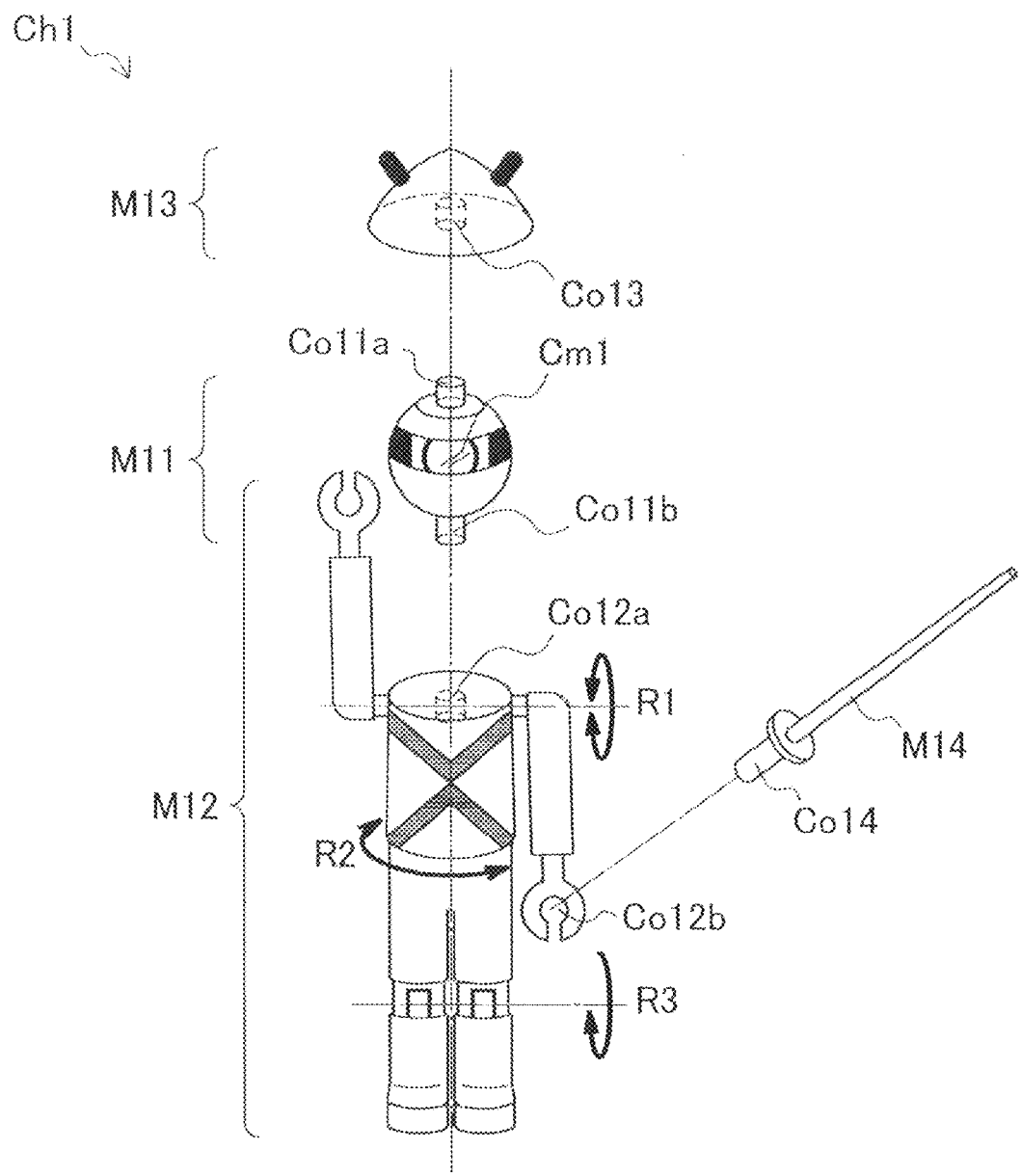
FIG. 2 is an explanatory diagram illustrating a configuration example of a housing of a first character.

FIG. 2 shows an example of a configuration of a housing of the character Ch1 shown as an example in FIG. 1. The character Ch1 is formed by assembling four modularized blocks M11, M12, M13, and M14. A head block M11 is a block corresponding to the head of the character. The head block M11 has a character camera Cm1 and projections Co11$a$ and Co11$b$. A body block M12 is a block corresponding to a trunk of the character. The body block M12 has a hollow Co12$a$. The head block M11 and the body block M12 are connected with each other by inserting the projection Co11$b$ of the head block M11 into the hollow Co12$a$ of the body block M12. In the example shown in FIG. 2, the body block M12 includes a chest unit, a waist unit, a pair of arms, and a pair of legs. Each of the arms can rotate in an R1 direction. The chest unit can rotate in an R2 direction to the waist unit. The legs can bend from joints in an R3 direction, the joints corresponding to knees. Each of the arms of the body block M12 has a hole Co12$b$. The accessory block M13 has a hollow Co13. The head block M11 and the accessory block M13 are connected with each other by inserting the projection Co11$a$ of the head block M11 into the hollow Co13 of the accessory block M13. A weapon block M14 has a projection Co14. The weapon block M14 is connected with one of the arms of the body block M12 by inserting the projection Co14 of the weapon block M14 into the hole Co12$b$ of the body block M12.

Figure 3:
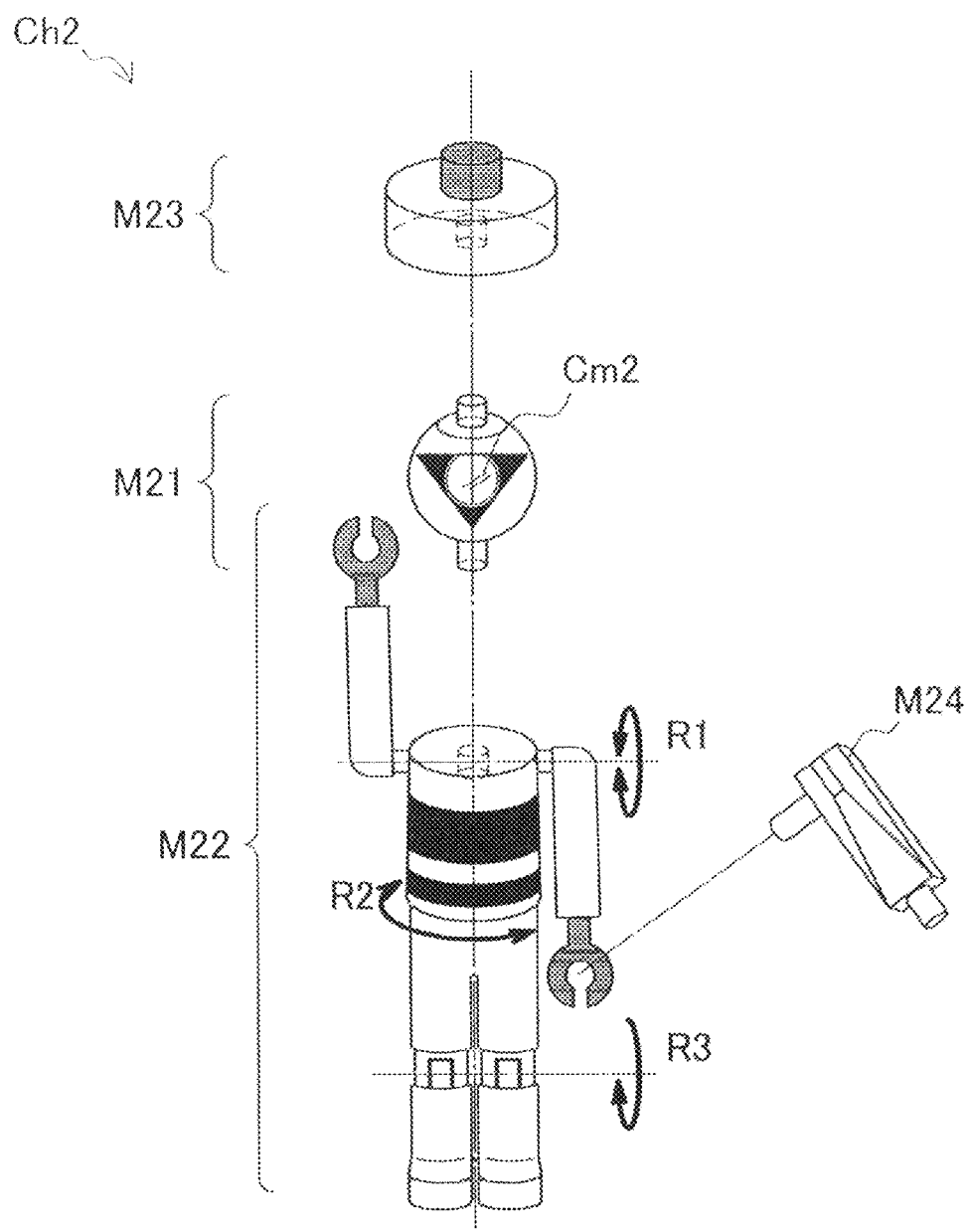
FIG. 3 is an explanatory diagram illustrating a configuration example of a housing of a second character.

FIG. 3 shows an example of a configuration of a housing of the character Ch2 shown as an example in FIG. 1. The character Ch2 is formed by assembling four modularized blocks M21, M22, M23, and M24. A head block M21 is a block corresponding to the head of the character. A body block M22 is a block corresponding to a trunk of the character. The head block M21 and the body block M22 are connected with each other. In the example shown in FIG. 3, the body block M22 includes a chest unit, a waist unit, a pair of arms, and a pair of legs. Each of the arms can rotate in an R1 direction. The chest unit can rotate in an R2 direction to the waist unit. The legs can bend from joints in an R3 direction, the joints corresponding to knees. The head block M21 and the accessory block M23 are connected with each other. The weapon block M24 is connected with one of the arms of the body block M22.

Since the modularized blocks for forming the housing of each of the characters are prepared as described above, it is also possible to connect the head block M11 shown in FIG. 2 with the body block M22 shown in FIG. 3 for example. In a similar way, it is also possible to replace the accessory blocks and the weapon blocks with other diverse blocks.

[2-2. Field Item]

Figure 4:
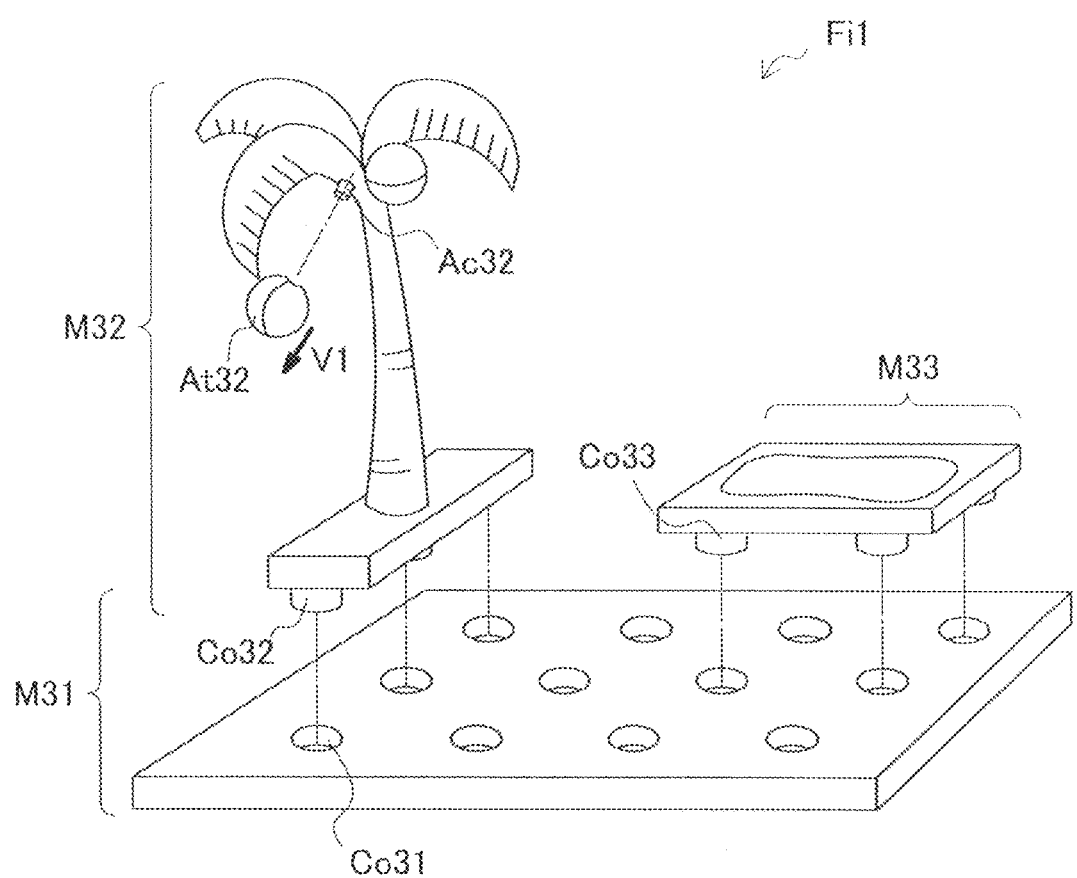
FIG. 4 is an explanatory diagram illustrating an example of a configuration of a field item.

FIG. 4 shows an example of a configuration of the field item Fi1 shown as an example in FIG. 1. The field item Fi1 is formed by assembling three modularized blocks M31, M32, and M33. A base block M31 has many hollows Co31. A plant block M32 has projections Co32. The base block M31 and the plant block M33 are connected with each other by inserting the projections Co32 of the plant block M32 into the hollows Co31 of the base block M31. The plant block M32 further includes an actuator Ac32 and an attachment At32. When the actuator Ac32 is driven, the attachment At32 is disconnected from the plant block M32 and falls in a V1 direction. A spring block M33 has projections Co33. The base block M31 and the spring block M33 are connected with each other by inserting the projections Co33 of the spring block M33 into the hollows Co31 of the base block M31.

Since the modularized blocks for forming each field item are prepared as described above, it is possible for a user to construct diverse battle fields according to his/her preference.

Note that, the blocks explained in this section are merely examples. For example, the toy system 1 may include another kind of block that does not shown in the figures such as a block in which the field camera is installed or a block in which a control module for controlling the battle is installed. Moreover, it is also possible to prepare a plurality of head blocks each having a character camera that has a function different from each other. For example, a range in which an attack can be performed in response to a later-described remote-attack event depends on an angle of view of a lens. Accordingly, if a plurality of head blocks each including a character camera having a different angle of view are prepared, the user can adjust strength of the characters by selecting from the head blocks. Alternatively, with regard to a same head block, it is also possible to replace a character camera with another character camera having different performance.

[2-3. Hardware in Character]

Figure 5:
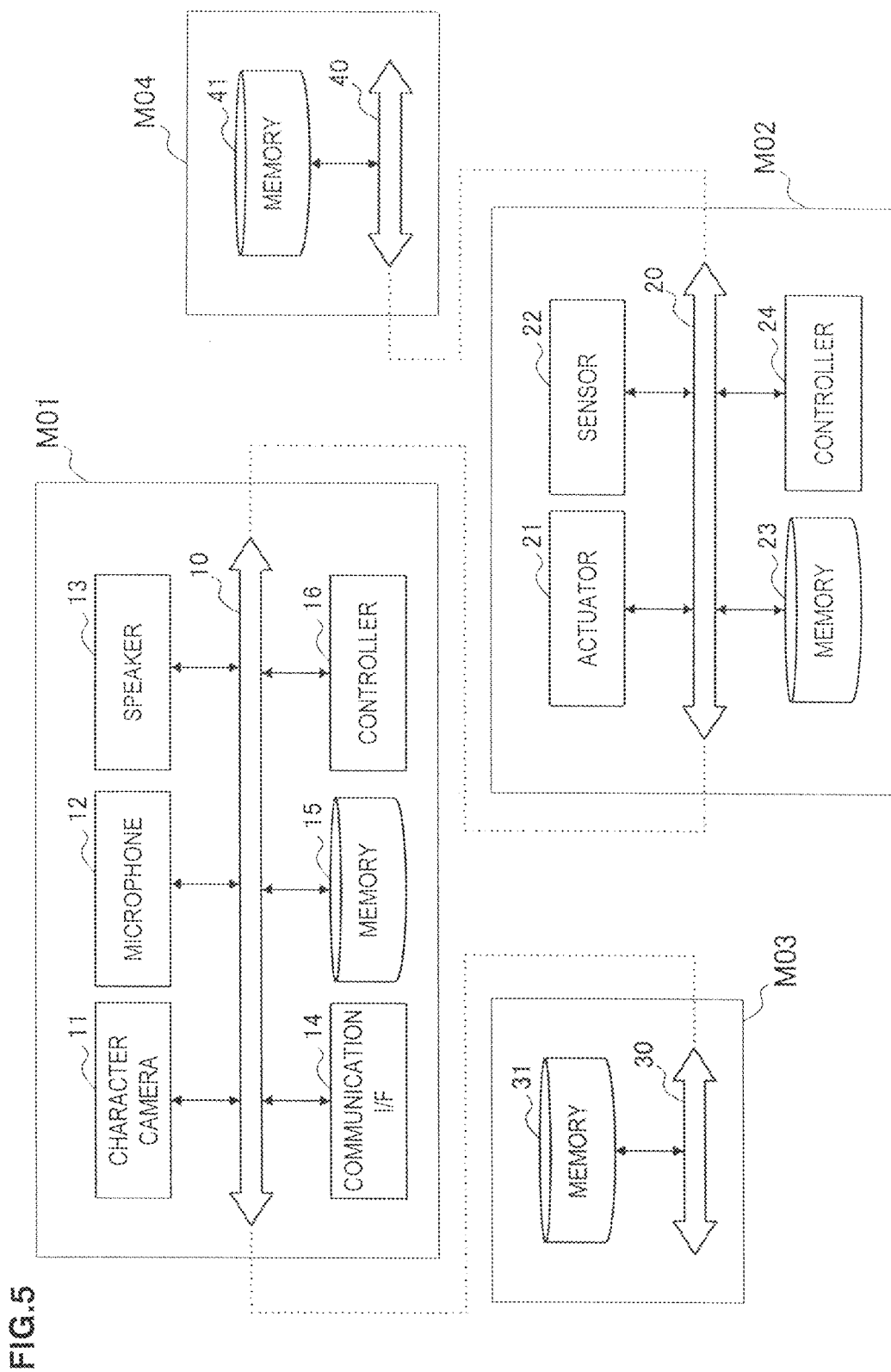
FIG. 5 is an explanatory diagram illustrating an example of a hardware configuration of a character.

FIG. 5 is an explanatory diagram illustrating an example of a hardware configuration of a character. Each character includes at least a head block M01 and a body block M02. In addition, each character may be connected with an accessory block M03 and a weapon block M04.

(1) Head Block

The head block M01 includes a bus 10, a character camera 11, a microphone 12, a speaker 13, a communication interface (I/F) 14, memory 15, and a controller 16.

The bus 10 connects the character camera 11, the microphone 12, the speaker 13, the communication I/F 14, the memory 15, and the controller 16 with each other. The microphone 12 senses a sound and generates an input sound signal. The speaker plays back the sound from an output sound signal. The communication I/F 14 establishes a communication connection with the control module or another character in accordance with an arbitrary wireless communication protocol or wired communication protocol. The memory 15 stores data and a program that are used by the controller 16 for controlling the head block M11 and an identifier which identifies an individual of the head block M01.

The controller 16 controls the head block M01. For example, the controller 16 transmits an image captured by the character camera 11 to the control module. In addition, the controller 16 transmits an input sound signal generated by the microphone 12 to the control module. Furthermore, the controller 16 forwards the output sound signal received from the control module to the speaker 13, and causes the speaker 13 to play back the sound. In addition, the controller 16 recognizes an identifier of another block through the bus 10, the another block being directly or indirectly connected with the head block M01. Subsequently, the controller 16 may notifies the control module of a list of an identifier of each block which constitutes the character.

(2) Body Block

The Body block M02 includes a bus 20, an actuator 21, a sensor 22, memory 23, and a controller 24.

The bus 10 connects the actuator 21, the sensor 22, the memory 23, and the controller 24 with each other. The actuator 21 drives moving parts (for example, shoulders, a waist, and knees of each of the characters shown as examples in FIGS. 2 and 3) of the body block M02. The sensor 22 senses that some real object touches the character, and generates a sensor signal. The memory 23 stores data and a program that are used by the controller 24 for controlling the body block M02 and an identifier which identifies an individual of the body block M02.

The controller 24 controls the body block M02. For example, the controller 24 forwards, to the actuator 21, a driving signal received from the control module through the communication I/F 14 of the head block M01, and causes the character to perform an instructed action. In addition, the controller 24 transmits sensor data generated by the sensor 22 to the control module.

(3) Accessory Block

The accessory block M03 includes a bus 30 and memory 31. The memory 31 stores an identifier which identifies an individual of the accessory block M03. The identifier stored in the memory 31 is read by the controller 16 of the head block M01 through the bus 30 and the bus 10. Note that, in a case where the block configuration (list of blocks constituting the character) of the character is recognized from an image, the accessory block M03 does not have to include the memory storing the identifier which identifies the individual as shown in the example in FIG. 5.

(4) Weapon Block

The weapon block M04 includes a bus 40 and memory 41. The memory 41 stores an identifier which identifies an individual of the weapon block M04. The identifier stored in the memory 41 is read by the controller 16 of the head block M01 through the bus 40, the bus 20, and the bus 10. Note that, in a way similar to the accessory block M03, in a case where the configuration of the character is recognized from an image, the weapon block does not have to include the memory storing the identifier.

[2-4. Hardware of Information Processing Apparatus]

The information processing apparatus 100 shown in FIG. 1 as an example includes the control module for controlling a battle in the toy system 1. The information processing apparatus 100 may be a versatile apparatus such as a personal computer (PC), a smartphone, a personal digital assistant (PDA), or a game console, or may be a dedicated apparatus that is implemented for a battle between characters. FIG. 6 is an explanatory diagram illustrating an example of a hardware configuration of the information processing apparatus 100. With reference to FIG. 6, the information processing apparatus 100 includes a camera 102, a user interface 104, a storage 108, a display 110, a communication I/F 112, a bus 116, and a control unit 118.

The camera 102 includes an image sensor such as a charge coupled device (CCD) or a complementary metal oxide semiconductor (CMOS), and captures an image. The camera 102 may be used as the above-described field camera. Note that, it is also possible for an imaging apparatus installed separately from the information processing apparatus 100 to be used as the field camera. The user interface 104 includes an input device such as a touch sensor, a pointing device, a keyboard, a button, and switch, and provides the user interface by which a user operates the information processing apparatus 100. The storage 108 includes a storage medium such as semiconductor memory or a hard disk, and stores data and a program that the control unit 118 uses. Note that, some piece of data and program explained in the present specification may be acquired from an external data source (for example, a data server, a network storage, or external memory) without being stored in the storage 108. The display 110 is constituted from a liquid crystal display (LCD), an organic light-emitting diode (OLED), a cathode ray tube (CRT), or the like, and displays an output image of the toy system 1. Note that, it is also possible for a display apparatus installed separately from the information processing apparatus 100 to be used for displaying the output image. The communication I/F 112 establishes a communication connection with the character or another item in the toy system 1 in accordance with an arbitrary wireless communication protocol or wired communication protocol. The bus 116 connects the camera 102, the user interface 104, the storage 108, the display 110, the communication I/F 112, and the controller 118 with each other. The control unit 118 corresponds to a processor such as a central processing unit (CPU) or a digital signal processor (DSP). The control unit 118 executes a program stored in the storage 108 or another storage medium, and causes various functions of the control module to be operated.

<3. Functional Configuration Example>

FIG. 7 is a block diagram showing an example of a functional configuration of a control module which may operate in the information processing apparatus 100 shown in FIG. 6. With reference to FIG. 7, the information processing apparatus 100 includes a block database (DB) 120, an attribute DB 130, a rule DB 140, a setting unit 150, a detection unit 160, an attribute management unit 170, an item control unit 180, and a display control unit 190.

[3-1. Block DB]

The block DB 120 is a database storing block data in which a known block that is usable in the toy system 1 is defined beforehand.

FIG. 8 shows a configuration of block data 121 as an example of data stored in the block DB 120. With reference to FIG. 8, the block data 121 includes five kinds of data items: "block ID", "type", "name", "appearance", and "action pattern". The "block ID" is an identifier for uniquely identifying each block. The "type" represents a kind of each block. For example, the blocks M11 and M21 are head blocks. The block M12 is a body block. The block M13 is an accessory block. The block M14 is a weapon block. The block M24 is a remote-attack weapon block. The block M31 is a base block for a field. The blocks M32 and M33 are field blocks. The "name" represents a name of each block. The "appearance" is data including an image feature amount indicating an appearance feature of each block. The image feature amount is used for recognizing a block shown in the captured image. The "action pattern" is data for identifying an action which may be performed by each block. For example, the head blocks M11 and M21 can outputs a sound or can emit light. The body block M12 can rotate a right arm, a left arm, and a waist, and can walk.

[3-2. Attribute DB]

The attribute DB 130 is a database storing attribute data indicating a variable attribute value associated with each character. Note that, in the present embodiment, a head block including a character camera has identity of a character for example. That is, if the body block, the accessory block, and the weapon block are replaced, a character is identical when the head block is identical. However, the present embodiment is not limited thereto. It is also possible that another kind of block has identity of the character.

FIG. 9A shows a first example of a configuration of attribute data 131 stored in the attribute DB 130. With reference to FIG. 9A, the attribute data 131 includes three kinds of data items: "head block ID", "character ID", and "life". The "head block ID" represents a block ID of a head block linked with each character. The "character ID" is an identifier for uniquely identifying each character. The "life" is a variable attribute value, and may decrease depending on a later-described interaction event.

FIG. 9B shows a second example of a configuration of attribute data 131 stored in the attribute DB 130. With reference to FIG. 9B, the attribute data 131 includes five kinds of data items: "head block ID", "character ID", "display name", "health points" and "maximum health points". The "display name" is a name of each character displayed on a screen. The "health points" is a variable attribute value, and may decrease or increase (be restored) depending on a later-described interaction event. The "maximum health points" is an upper limit of health points of each character.

Note that, the attribute value associated with each character is not limited to the above-described example. For example, a simple one-bit flag in which "1" represents ALIVE and "0" represents DEAD may be adopted as the attribute value.

[3-3. Rule DB]

The rule DB 140 is a database storing a set of rules for deciding how to progress a battle. In the present embodiment, the rule DB 140 stores block configuration data 141, party data 142, and an interaction rule 143.

(1) Block Configuration Data

The block configuration data 141 is data indicating a block configuration of an item formed by a plurality of blocks. FIG. 10 shows an example of a configuration of the block configuration data 141. With reference to FIG. 10, the block configuration data 141 includes three kinds of data items: "main block ID", "type", and "connection block". The "main block ID" is a single block ID to be a main block among blocks included in each item. A "main block ID" of a character is a head block ID. A "main block ID" of a field item may be a block ID of a base block, for example. The "type" represents a kind (character item, field item, or the like) of each item. The "connection block" represents a list of identifiers of blocks constituting each item. In an example shown in FIG. 10, a single character is formed by connecting the head block M11 with the blocks M12, M13, and M14. In addition, a single character is formed by connecting the head block M21 with the blocks M22, M23, and M24. In addition, a single field item is formed by connecting the base block M31 with the block M32.

(2) Party Data

The party data 142 is data for identifying whether characters are in an adversarial relationship or in an amicable relationship. Characters belonging to a same party are in the amicable relationship, and characters belonging to different parties are in the adversarial relationship. FIG. 11 shows an example of a configuration of party data 142. With reference to FIG. 11, the party data 142 includes three kinds of data items: "party ID", "display name", and "member". The "Party ID" is an identifier for uniquely identifying each party. The "display name" is a name of each party displayed on a screen. The "member" indicates a list of character IDs of characters belonging to each party. In an example shown in FIG. 11, characters Ch1 and Ch3 belong to a party P1 named "Earth Army". On the other hand, a character Ch2 belongs to a party P2 named "Mars Army".

(3) Interaction Rule

Figure 12A:
FIG. 12A is an explanatory diagram illustrating a first example of a configuration of an interaction rule.

The interaction rule 143 is data for prescribing an interaction event to be detected by the later-described detection unit 160. FIGS. 12A and 12B show a first example and a second example of a configuration of the interaction rule 143, respectively.

In the first example shown in FIG. 12A, the interaction rule 143 includes five kinds of data items: "first involvement block", "second involvement block", "type", "affected block", and "attribute change". The "first involvement block" and the "second involvement block" represent a combination of block IDs of blocks involved in each interaction event. The "type" represents a kind of each interaction event. With reference to the example in FIG. 12A, an interaction event between the weapon block M14 and the head block M21 or the body block M22 is a "direct attack" event. An interaction event between the weapon block M24 and the head block M11 or the body block M12 is a "remote attack" event. An interaction event between the field block M32 and the head blocks M11 or M21 is a "damage" event. An interaction event between the field block M33 and the body blocks M12 or M22 is a "restoration" event. The "effected block" represents which attribute value of a character of an involvement block is changed depending on each interaction event. In the example in FIG. 12A, a value of each "affected block" is the same as a value of each "second involvement block". The "attribute change" represents an amount of change of an attribute value depending on each interaction event. In the example shown in FIG. 12A, an attribute value of a character who has been attacked decreases by $X_1$ due to a "direct attack" event performed by the weapon block M14. An attribute value of a character who has been attacked decreases by $X_2$ due to a "remote attack" event performed by the weapon block M24. An attribute value of a character who has been touched to the field block M32 decreases by $X_3$ due to a "damage" event in which the field block M33 is involved. An attribute value of a character who has been touched to the field block M33 is restored by $X_4$ due to a "restoration" event in which the field block M33 is involved.

In the second example shown in FIG. 12B, the interaction rule 143 includes four kinds of data items: "involvement object", "involvement block", "type", and "attribute change". The "involvement object" represents a real object involved in each interaction event. In the example shown in FIG. 12B, not only an item including known blocks, but also the body of a user and a general object (for example, goods such as a pen, a book, and a dish, and a floor or wall in an battle environment) may also be involved in the interaction event. The "involvement block" represents a block ID of a block involved in each interaction event. An interaction event between the base block M31 and the body blocks M12 or M22 is an "accident" event. For example, when a character falls on the base block M31, an attribute value of the character decreases by $X_5$. An interaction event between the body of the user and the block M11, M12, M21, or M22 is a "damage" event. An interaction event between the general object and the block M11, M12, M21, or M22 is also the "damage" event.

A rule set including the above-described block configuration data 141, party data 142 and interaction rule 143 is dynamically set and updated by the later-described setting unit 150.

[3-4. Setting Unit]

The setting unit 150 sets the rule set stored in the above described rule DB 140. For example, the setting unit 150 may receive a list of identifiers of blocks constituting each character from a controller 16 of the head block of each character, and may recognize a block configuration of each character from the received list. Alternatively, the setting unit 150 may check an image feature amount of a block shown in an image captured by the character camera 11 or the field camera 102 against a known image feature amount stored in the block DB 120, and may recognize a block configuration of each item (character item and field item). On the other hand, it is also possible for the setting unit 150 to identify an individual of each block on the basis of a feature (for example, color (wavelength) a luminescent pattern, or a combination thereof) of light emitted from a light emitting device such as an LED set in each block, and to recognize a block configuration of each item. Subsequently, the setting unit 150 sets the recognized block configuration as the block configuration data 141 shown in FIG. 10 as an example.

Moreover, for example, when the detection unit 160 detects a rule event identifying the enemy character or a friend character, the setting unit 150 updates the party data 142 and sets an adversarial or amicable relationship between the characters. Here, the rule event may be a change in a block configuration of a character, a recognition of a certain gesture of the character, or a recognition of a certain sound command for example.

Figure 13:
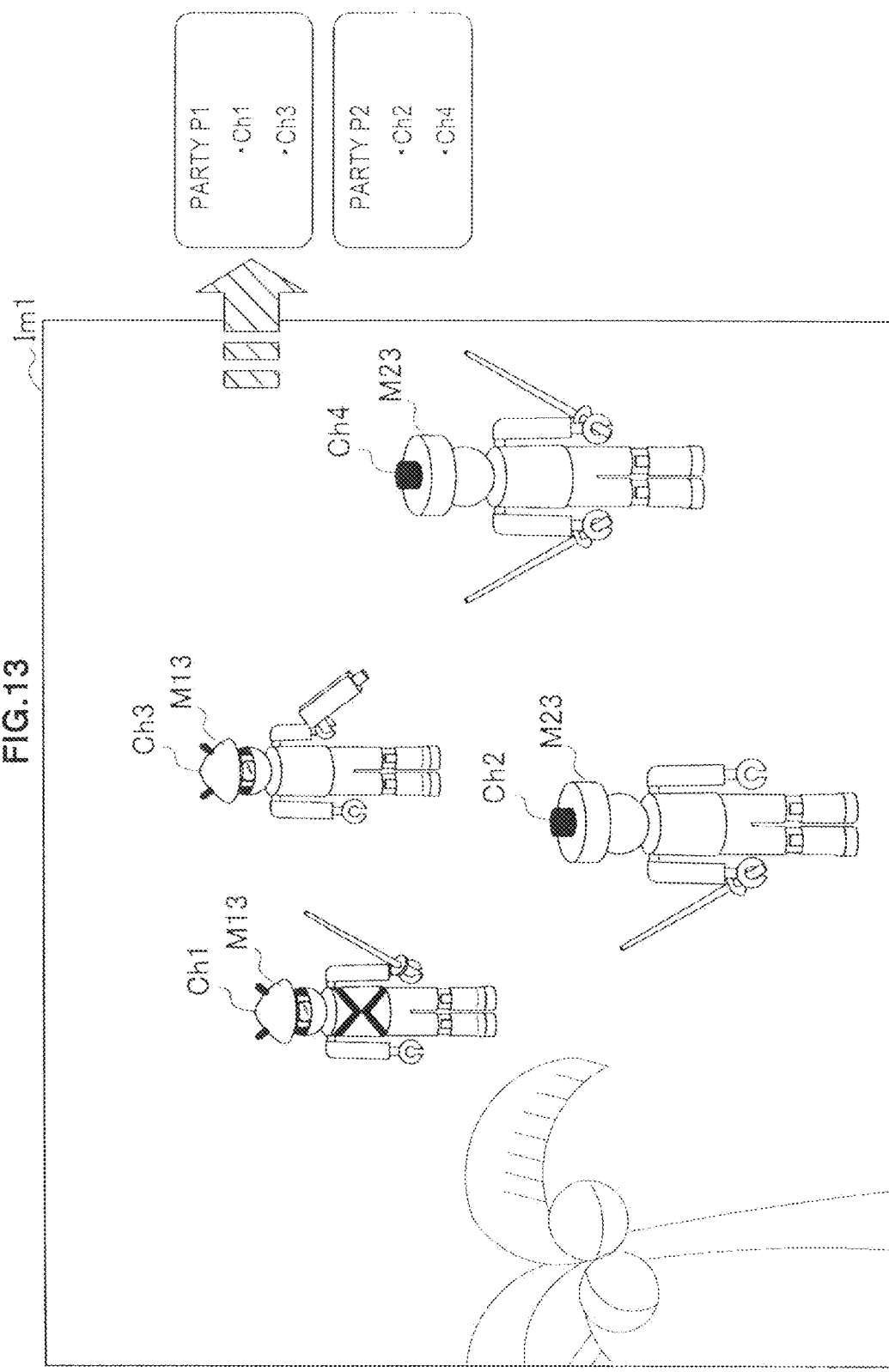
FIG. 13 is an explanatory diagram illustrating a first technique of setting a party of characters.

FIG. 13 is an explanatory diagram illustrating a first technique of setting a party of characters. FIG. 13 shows a captured image Im1 as an example. In the captured image Im1, four characters Ch1, Ch2, Ch3, and Ch4 are shown. Each of the characters Ch1 and Ch3 wears an accessory block M13. Each of the characters Ch2 and Ch4 wears an accessory block M23. The setting unit 150 may classify each character into the enemy character and the friend character on the basis of an appearance feature (color, shape, design, luminescent pattern, or the like) of such accessory block, for example. In an example shown in FIG. 13, the setting unit 150 classifies the characters Ch1 and Ch3 into the party P1, and classifies the characters Ch2 and Ch4 into the party P2. As a result, the character Ch3 becomes a friend character of the character Ch1. In addition, the characters Ch2 and Ch4 become enemy characters of the character Ch1.

FIG. 14 is an explanatory diagram illustrating a second technique of setting a party of a character. FIG. 14 shows a captured image Im2 as an example. The captured image Im2 is an image captured by a character camera of the character Ch1. In the captured image Im2, a scene where an arm of the character Ch1 and an arm of the character Ch3 perform a gesture such as a handshake is shown. The setting unit 150 classifies the characters Ch1 and Ch3 into the party P1 on the basis of such gesture, for example. As a result, the character Ch3 becomes a friend character of the character Ch1. Note that, the above-described gesture is a mere example. For example, it is also possible that the two characters are classified into different parties (that is, in an adversarial relationship) on the basis of a gesture of touching the weapon blocks held by the two characters with each other.

The setting unit 150 also updates the interaction rule 143 depending on the update of the block configuration data 141 or the party data 124. For example, when a character who participates in the battle wears a new weapon block, the setting unit 150 may add, to the interaction rule 143, a rule about an attack event in which the weapon block is involved. Moreover, when a new field item is set, the setting unit 150 may add, to the interaction rule 143, a rule about a damage event or a restoration event in which the field item is involved. In addition, when a party of some character is changed to another party, the setting unit 150 may delete a rule about an interaction event between the character and a new friend character, and may add a rule about an interaction event between the character and a new enemy character. As described above, the battle progresses in accordance with a dynamically-changeable rule.

[3-5. Detection Unit]

The detection unit 160 receives at least one of images $Im_1$, $Im_2$, . . . captured by the character camera and an image $Im_{env}$ captured by the field camera. In addition, the detection unit 160 may receive sensor data $Ss_1$, $Ss_2$, . . . from the sensor, and input sound signals $Sp_1$, $Sp_2$, . . . from the microphone. Subsequently, the detection unit 160 detects the above-described rule event. For example, the detection unit 160 may detect a change in a block configuration of a character item or a field item by using the image captured by the character camera or the field camera that capture the real space. Note that, the block configuration may be recognized by using any technique such as recognition of a marker (such as a two-dimensional barcode) shown in the captured image, a more advanced three-dimensional shape recognition, receipt of a block list from each item, and reading of information from a radio frequency identification (RFID) tag. In addition, it is also possible for the detection unit 160 to recognize a gesture performed by the character by using the captured image. The gesture may be performed by driving the actuator of the character, or may be performed by the user directly moving the character (for example, using his/her finger).

In addition, the detection unit 160 detects an interaction event between a character and a real object (another character, another item, the body of a user, or a general object) by using a captured image. Interaction events detected by the detection unit 160 include physical contact. The direct-attack event, the damage event, the restoration event, and the accident event shown in FIGS. 12A and 12B as the examples may be detected as physical contact between blocks (or between a block and a real object) which may be recognized from the captured image. In addition to (or instead of) the captured image, sensor data received from the character may be used for detecting the physical contact.

On the other hand, the physical contact is not necessary for the remote-attack event shown in the FIGS. 12A and 12B as the examples. The remote-attack event is an attack event in which a character having a weapon block for remote-attack is involved. More specifically, a state where an enemy character is shown in an image captured by a character camera of a character having a weapon block for remote-attack is assumed. When a certain user input is sensed in such state, the detection unit 160 detects the remote-attack event. Here, the certain user input may be a sound input (for example, "bang!" in a case where the weapon block is a rifle) or may be another kind of input. Accordingly, physical contact between characters is not necessary, and a battle imitating a gun battle can be achieved, for example.

The detection unit 160 continuously monitors a series of captured images to be input. Subsequently, when the detection unit 160 detects the rule event, the detection unit 160 notifies the setting unit 150 of the detected rule event. In addition, when the detection unit 160 detects the interaction event, the detection unit 160 notifies the attribute management unit 170 of the detected interaction event.

[3-6. Attribute Management Unit]

The attribute management unit 170 manages attribute data stored in the attribute DB 130. The attribute data includes a variable attribute value associated with each of one or more characters existing in a real space. For example, in a case where the detection unit 160 detects an interaction event, the attribute management unit 170 changes an attribute value of a character who is involved in the detected interaction event in accordance with the interaction rule 143 set by the rule DB 140. The attribute management unit 170 may refer to the interaction rule 143, and may decide an amount of change of the attribute value depending on a kind of a block that is involved in the interaction event.

FIG. 15 is an explanatory diagram illustrating a first example of change of an attribute value depending on an interaction event. FIG. 15 shows an image Im3 captured by a character camera of the character Ch2. In the captured image Im3, the weapon block M14 held by the character Ch1 who is an enemy character of the character Ch2 is shown at a close range. The detection unit 160 recognizes such state from the captured image Im3, assumes that the recognized state is physical contact, and detects a direct-attack event from the character Ch1 to the character Ch2. Subsequently, the attribute management unit 170 decreases the attribute value of the character Ch2 attacked by the weapon block M14 depending on the detected direct-attack event. In the example in FIG. 15, health points of the character Ch2 is decreased from "80" to "70" in the attribute data 131.

FIG. 16 is an explanatory diagram illustrating a second example of change of an attribute value depending on an interaction event. FIG. 16 shows an image Im4 captured by the character camera of the character Ch2. In the captured image Im4, the weapon block M24 held by the character Ch2 and the character Ch1 who is an enemy character of the character Ch2 are shown. When an input sound signal $Sp_2$ indicating a certain sound command is additionally input in such state, the detection unit 160 detects a remote-attack event from the character Ch2 to the character Ch1. Subsequently, the attribute management unit 170 decreases the attribute value of the character Ch1 attacked by the weapon block M24 depending on the detected remote-attack event. In the example in FIG. 16, health points of the character Ch1 is decreased from "90" to "60" in the attribute data 131.

FIG. 17 is an explanatory diagram illustrating a third example of change of an attribute value depending on an interaction event. FIG. 17 shows an image Im5 captured by a field camera. In the captured image Im5, the character Ch2 holding the weapon block M24, a plant block M32, and the character Ch1 who is an enemy character of the character Ch2 are shown. The plant block M32 is a block for a damage item. For example, when a sound command explained with reference to FIG. 16 is received, the later-described item control unit 180 drives an actuator of the plant block M32 which has remotely attacked, and causes an attachment At32 to fall. In the captured image Im5, the fallen attachment At32 is in contact with the character Ch1. The detection unit 160 recognizes such physical contact, and detects a damage event in which the character Ch1 is involved. Subsequently, the attribute management unit 170 decreases the attribute value of the character Ch1 depending on the detected damage event. In the example in FIG. 17, health points of the character Ch1 is decreased from "60" to "40" in the attribute data 131. Note that, the damage event may be detected not on the basis of such complicate scenario but on the basis of more simple physical contact between a damage item or another real object and a character.

FIG. 18 is an explanatory diagram illustrating a fourth example of change of an attribute value depending on an interaction event. FIG. 18 shows an image Im6 captured by a character camera or a field camera. In the captured image Im6, the character Ch1 who moves to on the field block M33 is shown. The field block M33 is a block for a healing item. The detection unit 160 recognizes a contact state between the character Ch1 and the field block M33 from the captured image Im6, and detects a restoration event in which the character Ch1 is involved. Subsequently, the attribute management unit 170 restores the attribute value of the character Ch1 depending on the detected restoration event. In the example in FIG. 18, health points of the character Ch1 is restored from "40" to "120" in the attribute data 131.

FIG. 19 is an explanatory diagram illustrating a fifth example of change of an attribute value depending on an interaction event. FIG. 19 shows an image Im7 captured by a character camera or a field camera. In the captured image Im7, the character Ch1 who fell is shown. The detection unit 160 recognizes a contact state between the character Ch1 and the base block M31 (or a floor) from the captured image Im7, and detects an accident event in which the character Ch1 is involved. Subsequently, the attribute management unit 170 decreases the attribute value of the character Ch1 depending on the detected accident event. In the example in FIG. 19, health points of the character Ch1 is decreased from "120" to "110" in the attribute data 131. A cause by which a character falls and an accident event is triggered may be any phenomenon such as an attack from another character, an unsuccessful walk, a (regular or irregular) attack using the body of a user, or wind pressure.

FIG. 20A is an explanatory diagram illustrating a sixth example of change of an attribute value depending on an interaction event. FIG. 20 shows an image Im8 captured by a character camera or a field camera. In the captured image Im8, the user body Ub1 and the character Ch1 are shown. The detection unit 160 recognizes a contact state between the user body Ub1 and the character Ch1 from the captured image Im8, and detects a damage event in which the character Ch1 is involved. Subsequently, the attribute management unit 170 decreases the attribute value of the character Ch1 depending on the detected damage event. In the example in FIG. 20A, health points of the character Ch1 is decreased from "110" to "60" in the attribute data 131. It may seem that such attack from the user is absurd. However, for example, assuming that users in an earlier age group enjoy a battle, the battle sometimes becomes more enjoyable when such "lawless" rule is allowed.

However, if an operation such as moving the character becomes a cause of damage, normal progress of the battle may be disturbed. Accordingly, the attribute management unit 170 does not have to decrease the attribute value of the character when the body of the user makes a certain gesture or a certain pose. FIG. 20B is an explanatory diagram illustrating an exception to an interaction event in which a body of a user is involved. FIG. 20B shows an image Im9 captured by a character camera or a field camera. In the captured image Im9, the user body Ub1 and the character Ch1 are shown. The user body Ub1 makes a pose such as grabbing the character Ch1. When such pose performed by the user body Ub1 is recognized, the detection unit 160 does not detect a damage event. Accordingly, the user can move the character without damaging the character.

The attribute management unit 170 changes the attribute of the character depending on the interaction event as described above, and instructs the item control unit 180 to execute reaction related to the change. With reference to a control pattern of the block data 131, the attribute management unit 170 can determine what kind of reaction can be executed by each character.

[3-7. Item Control Unit]

The item control unit 180 controls execution of an action (including reaction) performed by each item by transmitting a driving signal Ct1, Ct2 . . . , to each item. For example, the item control unit 180 moves each character or changes posture of each character depending on a user input $U_{in}$ input through the user interface 104. In addition, the item control unit 180 drives a character whose attribute value has been changed depending on an instruction from the attribute management unit 170, and causes reaction related to the change to be executed. For example, the item control unit 180 causes a character whose attribute value has been restored to execute reaction such as raising its hands. Alternatively, the item control unit 180 may cause a character whose attribute value has been decreased to output a sound like getting damaged. Alternatively, the item control unit 180 may cause a character whose attribute value has become zero to execute falling reaction.

Kinds of actions which each item can execute depend on a kind of the actuator that each item has. In the technology according to the present disclosure, not only a hard actuator such as such as a stepping motor, a servomotor, or a vibration motor, but also a soft actuator which is driven by an electrical or chemical reaction may be used. In addition, an action (for example, rocket punch as an attack action, or an explosion or collapse as reaction) such as a part is disconnected from a block may be executed. Moreover, reaction such as an expression of a character changes may be executed using an electronic paper attached to a surface of a bock, although such electronic paper is not an actuator, strictly. An example of a block which may be further introduced for such action is explained below.

[3-8. Display Control Unit]

The display control unit 190 controls display of an output image in the toy system 1. For example, the display control unit 190 may output, to the display 110, an image captured by a character camera or a field camera without any change. Alternatively, in order to support a more rich battle, it is also possible for the display control unit 190 to overlay an augmented reality (AR) object on a captured image, generate an AR image, and output the generated AR image to the display 110. In addition, the display control unit 190 may cause the display 110 to display a graphical user interface (GUI) by which a user views or edits information such as an attribute of a character, a currently set rule, or block data.

FIG. 21 is an explanatory diagram illustrating a first example of an image that may be displayed in the present embodiment. FIG. 21 shows an AR image Im11 as an example. The AR image Im11 is an image generated by overlaying AR objects A11, A12, A13, A14, and A15 on a captured image. The AR objects A11 and A12 each indicate a name of a character, a name of a party to which the character belongs, and a magnitude of a current attribute value of the character. The AR object A13 indicates a name of a weapon block held by a character and its attack power. The AR object A14 is a sight indicating a range in which the weapon block for remote attack can perform an attack. The AR object A15 is an object that emphatically accentuates the detected interaction event. Accentuation such as the weapon item shines may be performed. By providing such AR image, it is possible to show a battle situation to a user in a more understandable way, cause the user to consider a more advanced battle plan, and improve entertainment properties of the battle.

FIG. 22 is an explanatory diagram illustrating a second example of an image that may be displayed in the present embodiment. FIG. 22 shows an AR image Im12 as an example. The AR image Im12 includes a field camera image W1, a character camera image W2, and a button B1. The button B1 is used for diverse purposes that a user switches images, and stops a progress of the battle or resets the battle, for example. The field camera image W1 is an AR image generated by overlaying AR objects A21 and A22 on an image captured by a field camera. The character camera image W2 is an image captured by a character camera. With reference to FIG. 22, it is possible to keep realistic sensation of the battle by providing the clear image captured from a character perspective without any change, and to make the battle more rich by simultaneously providing an AR image captured in an overhead view.

<4. Flow of Processing>

Figure 23:
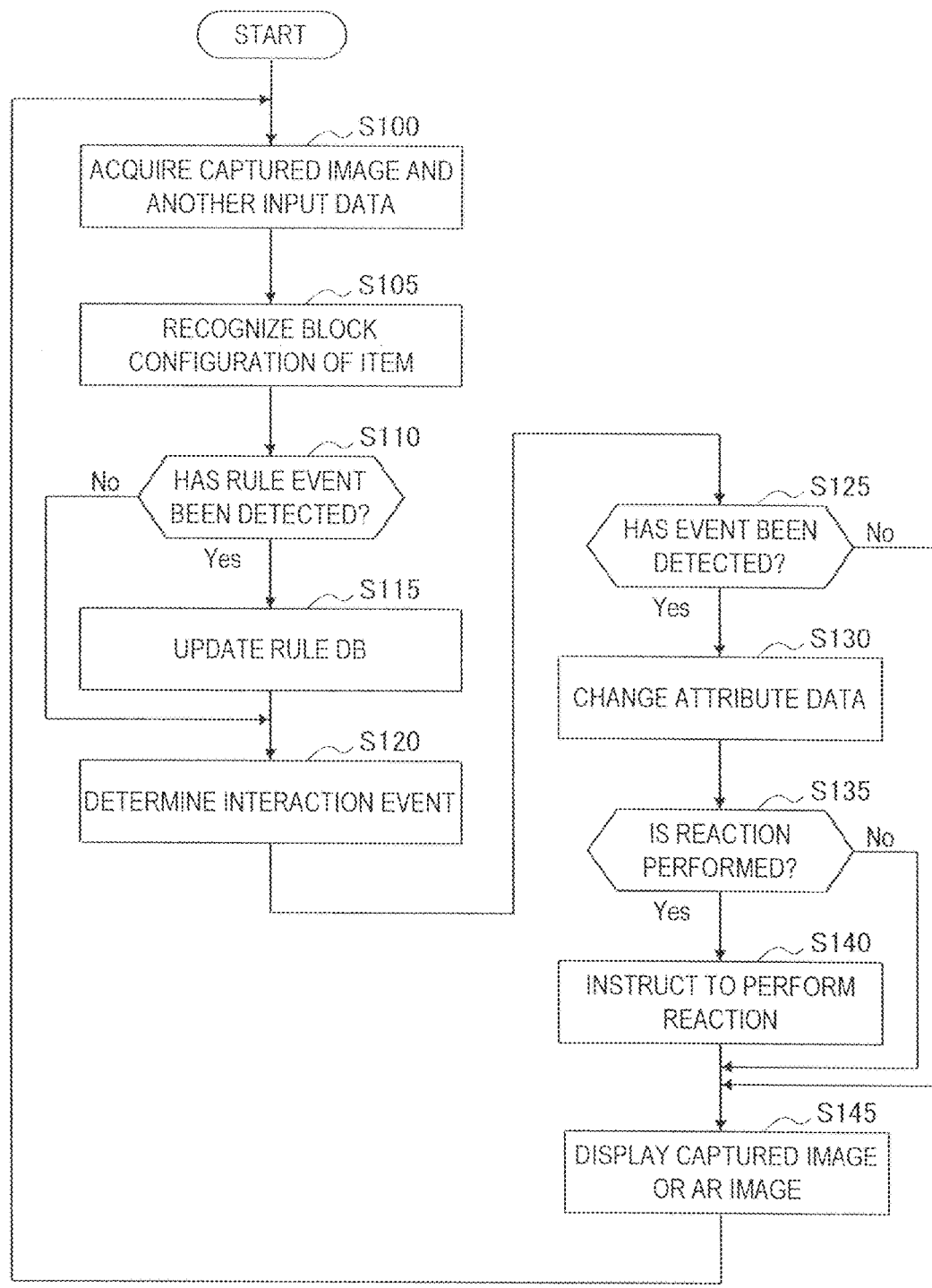
FIG. 23 is a flowchart showing an example of an overall flow of information processing according to en embodiment.

FIG. 23 is a flowchart showing an example of an overall flow of information processing according to the present embodiment.

With reference to FIG. 23, the detection unit 160 first acquires an image captured by a character camera or a field camera, and another kind of input data (Step S100).

Subsequently, by using the acquired image or data, the detection unit 160 recognizes a block configuration of each item existing in a battle environment (Step S105). Next, the detection unit 160 determines a rule event. In a case where the rule event has been detected, the detection unit 160 notifies the setting unit 150 of the detected rule event (Step S110). When receiving the notification of the rule event, the setting unit 150 updates at least one of block configuration data 141, party data 142, and interaction rule 143 that are stored in the rule DB 140 (Step S115).

Next, the detection unit 160 determines an interaction event (Step S120). In a case where the interaction event has been detected, the detection unit 160 notifies the attribute management unit 170 of the detected interaction event (Step S125). When receiving the notification of the interaction event, the attribute management unit 170 changes an attribute value of an involved character stored in the attribute DB 130 depending on the notified interaction event (Step S130). In addition, the attribute management unit 170 determines whether to perform reaction with the change of the attribute value (Step S135). In a case where it has been determined that the reaction have to be performed, the item control unit 180 drives a character whose attribute value has been changed, and causes reaction related to the change to be executed (Step S140).

Next, the display control unit 190 outputs the captured image or the AR image on which an AR object is overlaid to the display 110, and displays such image on a screen (Step S145).

Subsequently, the processing returns to Step S100 and the above-described processing is repeated with respect to a new captured image.

<5. Diverse Blocks>

With reference to FIGS. 2 to 4, examples of typical blocks which may constitute a character or a field item have been explained. In this section, another example of blocks that may be included in the toy system 1 is explained.

(1) Body Block Transferring by Vibration

Figure 24:
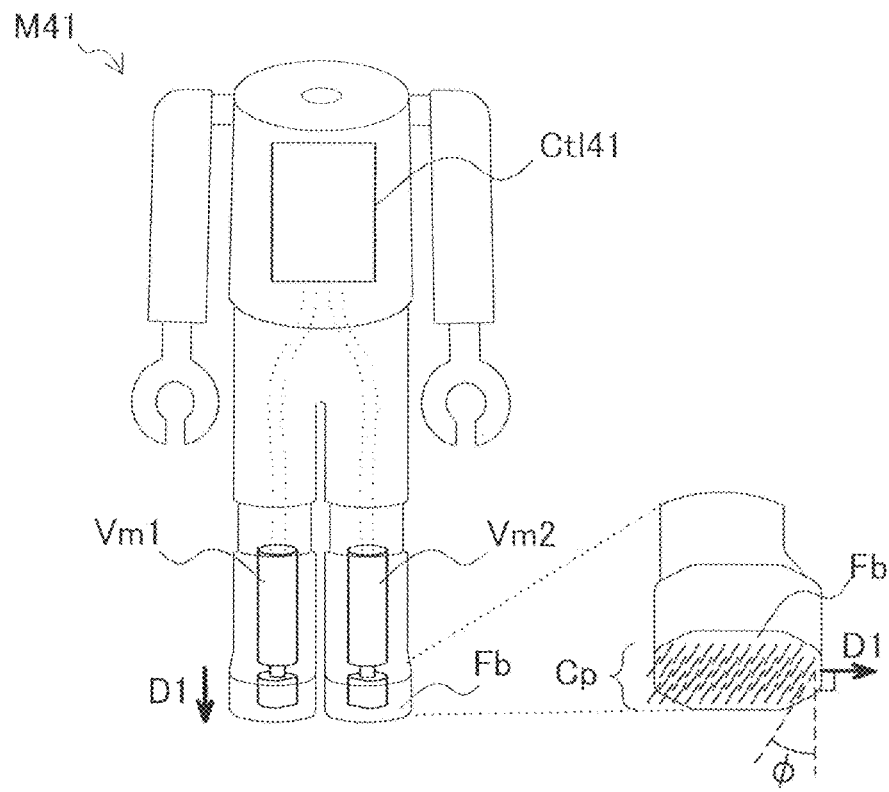
FIG. 24 is a first explanatory diagram illustrating another example of blocks that may be included in a toy system.

FIG. 24 is a first explanatory diagram illustrating another example of blocks that may be included in the toy system 1. With reference to FIG. 24, a body block M41 includes a controller Ctl41 built in its trunk part, a vibration motor Vm1 built in its right leg part, and a vibration motor Vm2 built in its left leg part. On all over a foot-bottom surface Fb of each leg, many capillaceous bodies Cp are provided. The capillaceous body Cp has an inclination angle φ to a perpendicular to the foot-bottom surface Fb toward back in transferring direction D1. When the vibration motors Vm1 and Vm2 are driven and rotated by the controller Ctl41, the right leg and the left leg of the body block M41 vibrate. The vibration acts on elasticity or flexibility of the capillaceous bodies Cp on the foot-bottom surfaces Fb, generates ahead power, and causes the body block M41 to transfer in the transferring direction D1. It is also possible for the controller Ctl41 to cause the vibration motor Vm1 to rotate faster than the vibration motor Vm2, and thereby to cause the body block M41 to turn in the counter-clockwise direction. In a similar way, it is also possible for the controller Ctl41 to cause the vibration motor Vm2 to rotate faster than the vibration motor Vm1, and thereby to cause the body block M41 to turn in the clockwise direction. Note that, instead of the capillaceous bodies, it is also possible to use plate-like bodies.

(2) Block Including Projector

Figure 25:
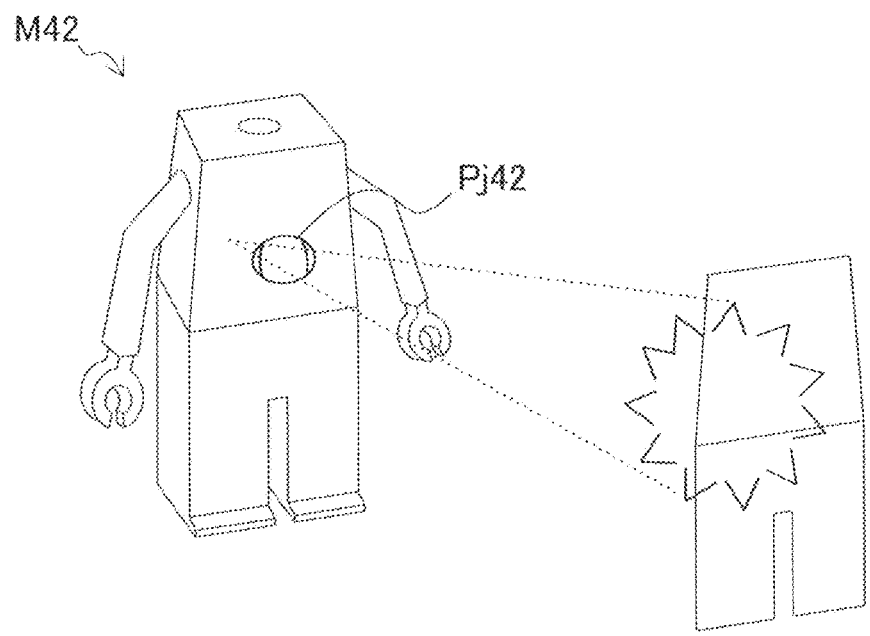
FIG. 25 is a second explanatory diagram illustrating another example of blocks that may be included in a toy system.

FIG. 25 is a second explanatory diagram illustrating another example of blocks that may be included in the toy system 1. With reference to FIG. 25, a body block M42 includes a projector Pj42 (for example, miniature pico projector) which emits projection light through a lens provided in front of its trunk part. The projector Pj42 is typically used for projecting a projection image which accentuates a battle. For example, the projection image may be an image showing that a bullet hits a target when a character performs a remote attack. Alternatively, the projection image may be an image of smoke or fire. On the other hand, the projector Pj42 may project battle information that may include an attribute value or a party of a character, by using a projection image. Note that, the present embodiment is not limited to the example shown in FIG. 25. It is also possible that a different kind of block from the body block includes a projector.

(3) Accessory Block Including Actuator

Figure 26:
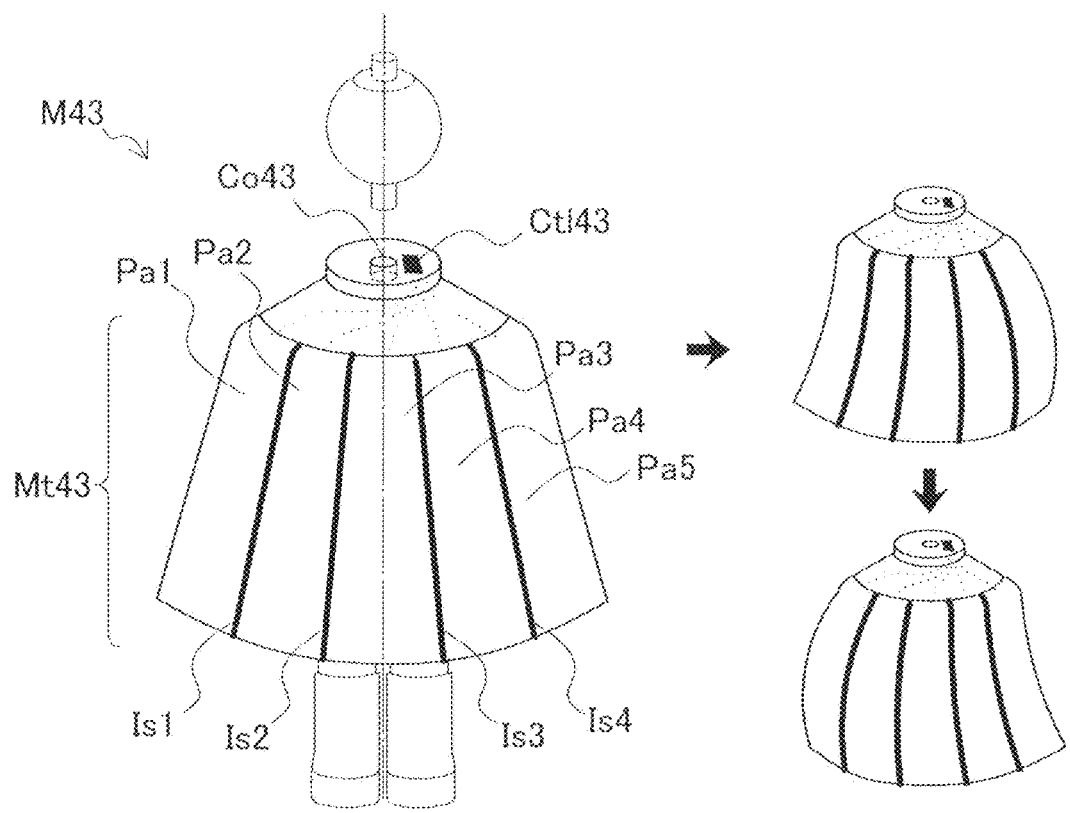
FIG. 26 is a third explanatory diagram illustrating another example of blocks that may be included in a toy system.

FIG. 26 is a third explanatory diagram illustrating another example of a block that may be included in the toy system 1. With reference to FIG. 26, an accessory block M43 has a hollow Co43 which is used for connecting with another block. In addition, the accessory block M43 includes a controller Ctl43 and a mantle part Mt43. The mantle part Mt43 includes a plurality of polymer actuators (EAP: electro-active polymers) Pa1 to Pa5 and a plurality of insulators Is1 to Is4. Each of the polymer actuators Pa1 to Pa5 which are also referred to as artificial muscles is formed into a band shape and bends depending on a potential difference applied by the controller Ctl42. Each of the insulators Is1 to Is4 bonds two polymer actuators that are adjacent with each other, and insulates the polymer actuators. The controller Ctl43 can diversely change a shape of the mantle part Mt43 by controlling patterns of the potential differences applied to the polymer actuators Pa1 to Pa5. For example, the controller Ctl43 may change the shape of the mantle part Mt43 so as to flap in the wind, as reaction of a character who has performed an attack or reaction of a character who has been attacked.

(4) Head Block Including Actuator

Figure 27:
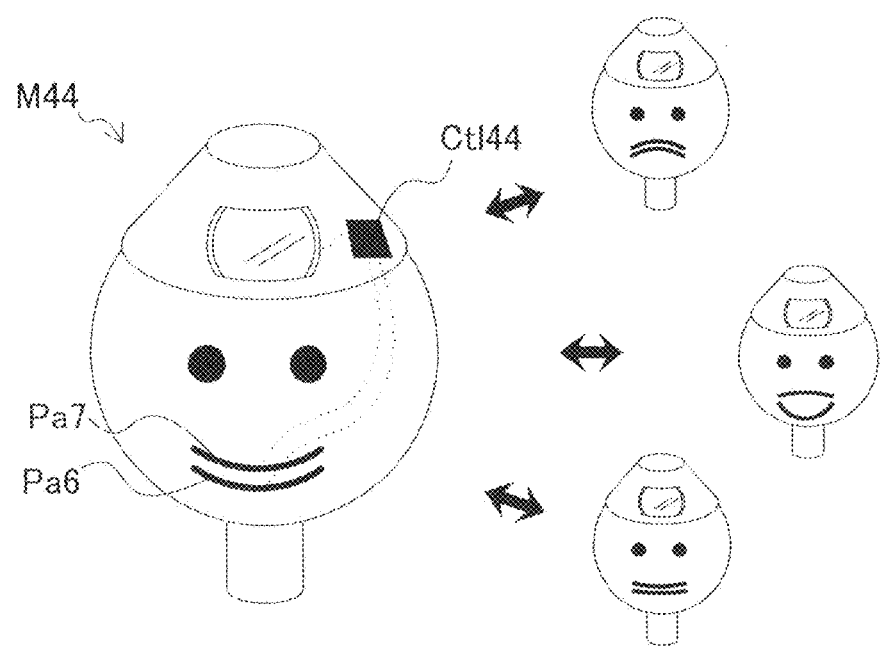
FIG. 27 is a fourth explanatory diagram illustrating another example of a block that may be included in a toy system.

FIG. 27 is a fourth explanatory diagram illustrating another example of a block that may be included in the toy system 1. With reference to FIG. 27, a head block M44 includes a controller Ctl44 and two polymer actuators Pa6 and Pa7. Each of the polymer actuators Pa6 and Pa7 is formed into a bar shape or a band shape, and is provided in a parallel manner with each other so as to make lips of the character. Each of the polymer actuators Pa6 and Pa7 bends depending on a potential difference applied by the controller Ctl44. The controller Ctl44 can diversely change a shape of the lips by controlling patterns of the potential differences applied to the polymer actuators Pa6 and Pa7. For example, the controller Ctl44 may change the shape of the lips of the character depending on the identification of an enemy character or a friend character, or depending on an event such as success of an attack or decrease in an attribute value.

(5) Head Block in which Expression is Changed

Figure 28:
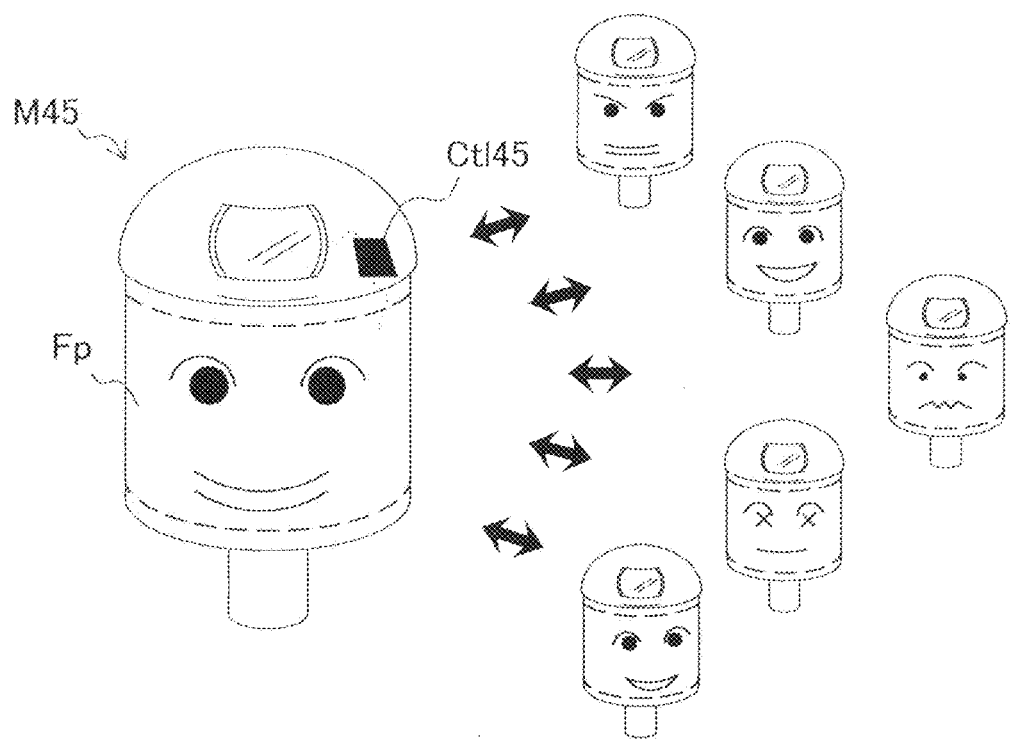
FIG. 28 is a fifth explanatory diagram illustrating another example of a block that may be included in a toy system.

FIG. 28 is a fifth explanatory diagram illustrating another example of a block that may be included in the toy system 1. With reference to FIG. 28, a head block M45 includes a controller Ctl45 and a display plane Fp. The display plane Fp includes a flexible electronic paper, and is provided so as to cover at least the face of the head bock M45. The controller Ctl45 causes a face image of a character to be displayed on the display plane Fp. The example in FIG. 28 shows six types of face images which may be displayed on the display plane Fp. For example, the controller Ctl45 may change the face image (expression) of the character depending on the identification of an enemy character or a friend character, or depending on an event such as success of an attack or decrease in an attribute value.

(6) Weapon Block Receiving Light

Figure 29:
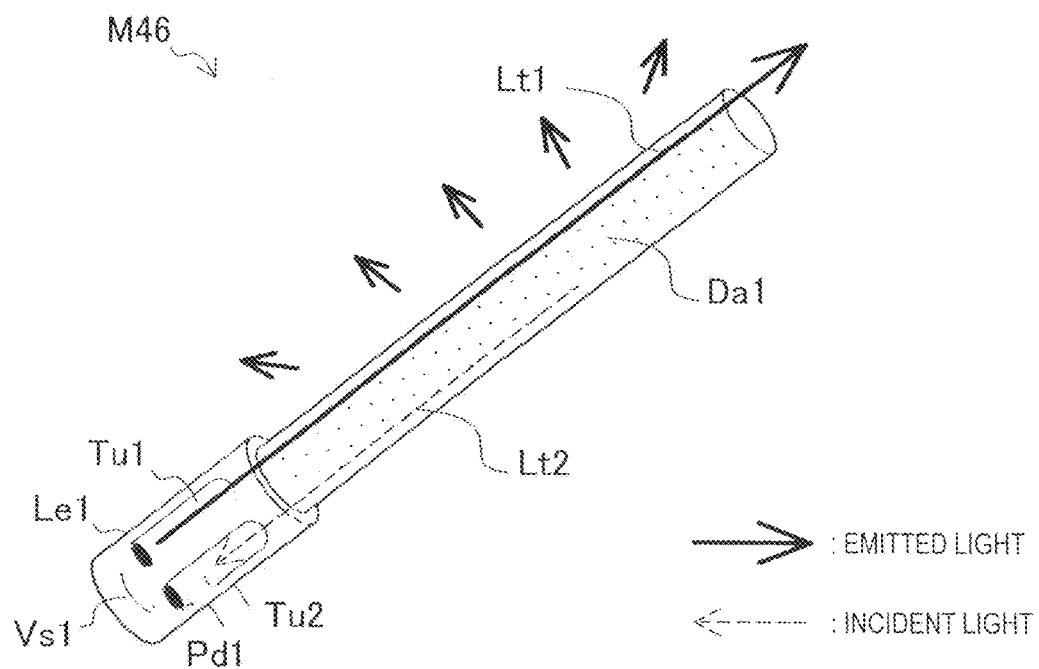
FIG. 29 is a sixth explanatory diagram illustrating another example of a block that may be included in a toy system.

FIG. 29 is a sixth explanatory diagram illustrating another example of a block that may be included in the toy system 1. With reference to FIG. 29, a weapon block M46 has a grip part and a blade part. In the grip part, a vibration sensor Vs1, a light emitting device Le1, an emission tube Tu1, a light receiving device Pd1, and an incident tube Tu2 are built. A housing of the blade part is dilled with a diffusing agent Da1. The vibration sensor Vs1 includes a piezoelectric element for example, and detects vibration generated by touch between the weapon block M46 and another block. The light emitting device Le1 includes a light emitting diode (LED) for example, and emits light Lt1 (such as visible light or infrared light) having a first wavelength. When the emitted light Lt1 has passed through the emission tube Tu1 and reached the blade part, the emitted light Lt1 is diffused by the diffusing agent Da1. When another block that emits light having a second wavelength comes into contact with the weapon block M46, the light emitted from the another block enters into the incident tube Tu2 as incident light Lt2. The light receiving device Pd1 includes a photodiode for example, and detects the incident light Lt2. The incident tube Tu2 has a certain length in an axial direction of the weapon block M46, and limits light that reaches the light receiving device Pd1 to the light Lt2 (light having directivity in the axial direction) incident from the another block which is in contact with the weapon block M46. For example, in a case where the vibration sensor Vs1 detects vibration at the same time when the light receiving device Pd1 detects the incident light Lt2, the detection unit 160 may detects a rule event or interaction event according to contact between the weapon block M46 and the another block. By adopting such double detection condition, erroneous detection of an event can be reduced, the erroneous detection being caused by light that enters without vibration or contact as a noise.

Note that, a wavelength of the light Lt1 (for example, red light or green light) emitted from the light emitting device Le1 can be changed depending on a user setting. Accordingly, the user can freely set a party on the basis of the setting of the wavelength of the weapon block M46. In addition, it is also possible for the light receiving device Pd1 to identify incident light having a plurality of wavelengths. Accordingly, both contact between an enemy character and the weapon block and contact between a friend character and the weapon block can be detected in distinction from each other.

(7) Block to be Destroyed

Figure 30:
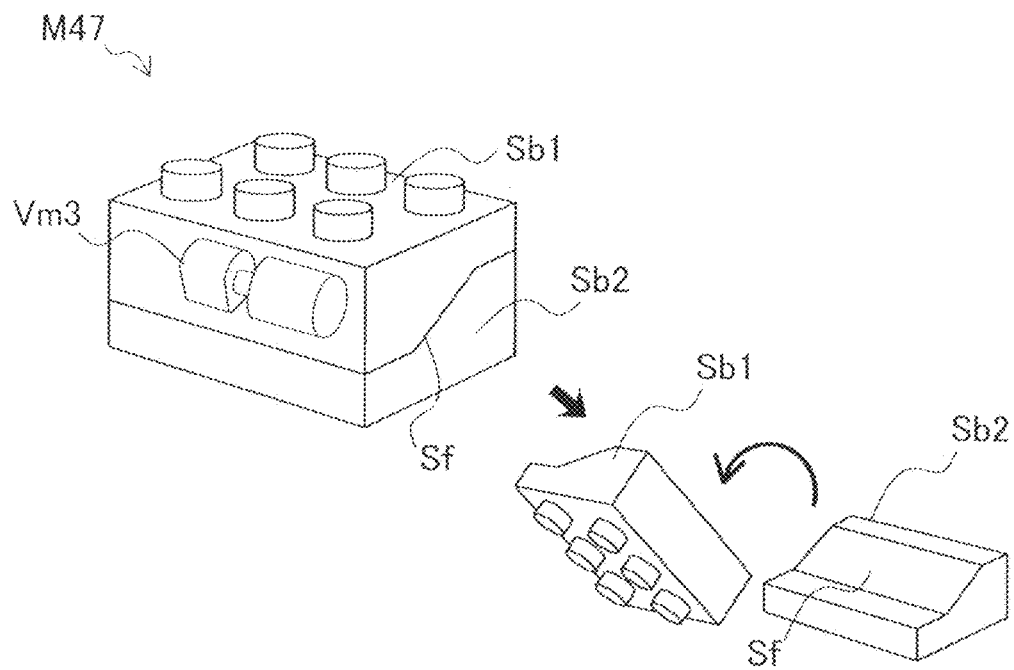
FIG. 30 is a seventh explanatory diagram illustrating another example of a block that may be included in a toy system.

FIG. 30 is a seventh explanatory diagram illustrating another example of a block that may be included in the toy system 1. With reference to FIG. 30, a field block M47 includes two sub blocks Sb1 and Sb2. A part of a bottom surface of the sub block Sb1 and a part of a top surface of the sub block Sb2 forms an inclined surface Sf having a slope. In a state where the sub block Sb1 is placed on the sub block Sb2, positions and slopes of both inclined surfaces are identical. In the sub block Sb1, there is a vibration motor Vm3. When the vibration motor Vm3 is driven and rotated, the inclined surfaces of the sub blocks Sb1 and Sb2 move by influence of the vibration, and finally the sub block Sb1 is disconnected and falls from the sub block Sb2. For example, as reaction in response to an event such as an attack performed by a character in a battle, the field block M47 may be destroyed in accordance with the above-described mechanism. Note that, such destruction mechanism may be adopted for a block that configures a character.

(8) Block to be Burned

Figure 31:
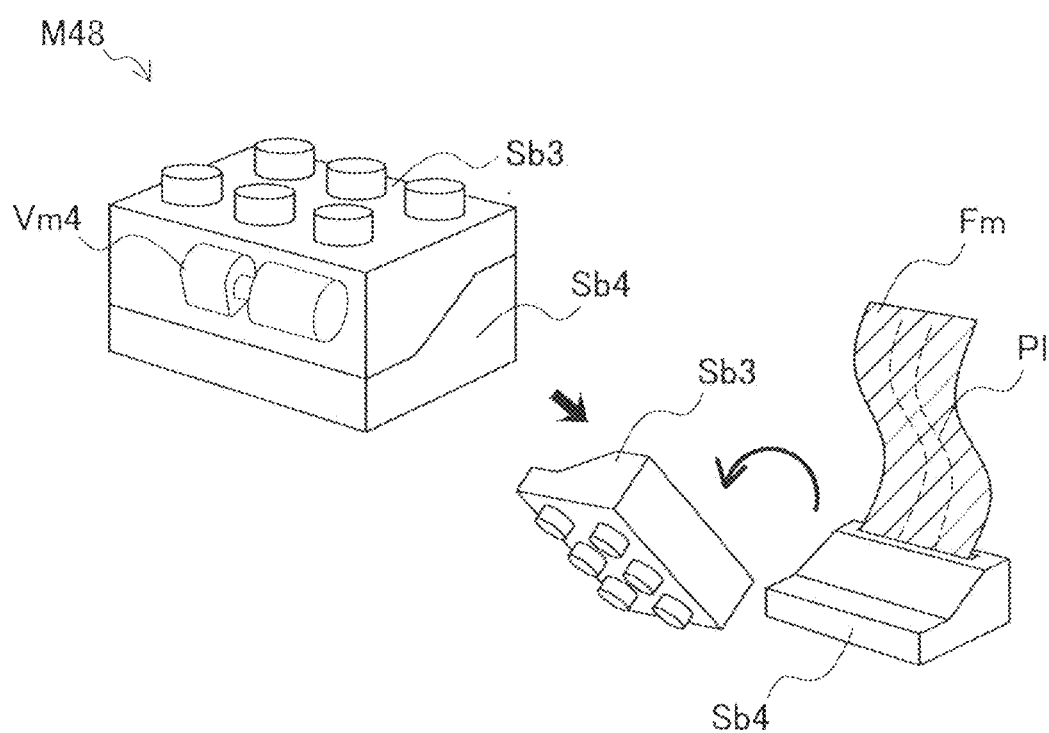
FIG. 31 is an eighth explanatory diagram illustrating another example of a block that may be included in a toy system.

FIG. 31 is an eighth explanatory diagram illustrating another example of a block that may be included in the toy system 1. With reference to FIG. 31, a field block M48 includes two sub blocks Sb3 and Sb4. A part of a bottom surface of the sub block Sb3 and a part of a top surface of the sub block Sb4 form an inclined surface having a slope. In a state where the sub block Sb3 is placed on the sub block Sb4, positions and slopes of both inclined surfaces are identical. In the sub block Sb3, there is a vibration motor Vm4. The sub block Sb4 includes a pillar P1 and a film Fm which are rolled up and stored in the sub block. The film Fm is colored red which represents fire. The Pillar P1 may be a linear object made of carbon steel, shape-memory alloy, or another material having elasticity. When the vibration motor Vm4 is driven and rotated, the inclined surfaces of the sub blocks Sb3 and Sb4 move by influence of the vibration, and finally the sub block Sb3 is disconnected and falls from the sub block Sb4. Subsequently, the film Fm and pillar P1 stored in the sub block stand up from the sub block Sb4 by restoring force of the pillar P1. As a result, accentuation is achieved as if the field block M48 is burned. For example, as reaction in response to an event such as an attack performed by a character in a battle, the field block M48 may be burned in accordance with the above-described mechanism.

(9) Prevention of Secret Filming Using Block having Camera

Some of the above-described blocks have cameras. In order to prevent the miniature cameras from being used for unwanted purposes such as secret filming, such blocks may have a mechanism to limit image capturing of a real object that is not involved in a battle. For example, in general, a size of a battle field is within a range from a few centimeters to tens of centimeters. Accordingly, adjustment of a focus of a camera included in the toy system 1 is limited to an imaging distance of tens of centimeters or less, and depth of field is limited to a shallow value. In this way, a subject outside a range of the battle field can be prevented from being clearly imaged. Such limitations may be achieved as physical features of the camera, or may be performed on a software basis. In addition, it is also possible that a captured image is automatically processed by applying an object recognition technology in an image processing field in a manner that only a known block and another real object registered beforehand are clearly shown.

In addition, a mechanism for showing to a third person that image capturing has been started or an image is being captured may be added to a block having a camera. As an example of such mechanism, flashing light, lighting warning light, displaying a text "on camera", or beeping a warning sound may be adopted.

Figure 32:
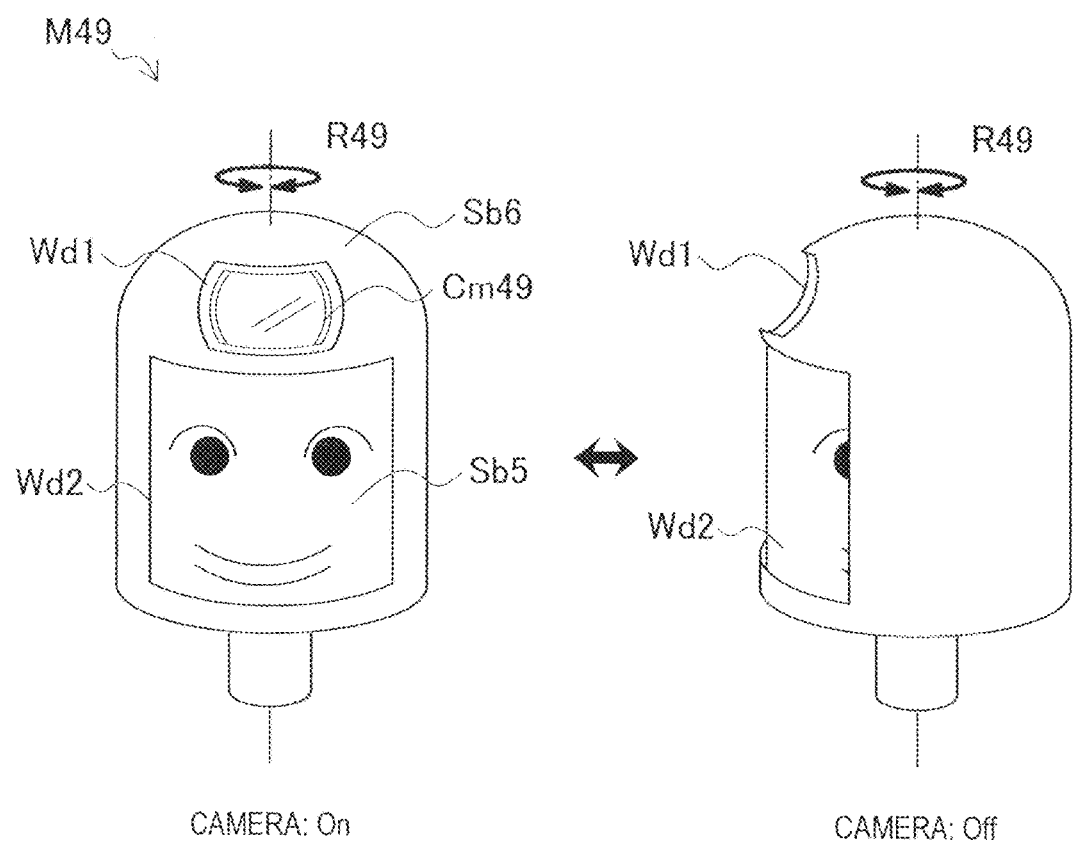
FIG. 32 is a ninth explanatory diagram illustrating another example of a block that may be included in a toy system.

Alternatively, as shown in FIG. 32, a mechanism for switching on/off of a camera may be adopted. With reference to FIG. 32, a head block M49 includes two sub blocks Sb5 and Sb6. The sub block Sb5 has a character camera Cm49. The sub block Sb6 has windows Wd1 and Wd2, and is capable of rotating in R49 direction to the sub block Sb5. Depending on a rotated position of the sub block Sb6, the character camera Cm49 is turned on or turned off (by means of a rotary switch or a magnetic encoder, for example). For example, in a case where a rotated position of the sub block Sb6 is in a position shown in the left-hand side of FIG. 32, a lens of the character camera Cm49 is exposed to the outside world through the window Wd1, and the character camera Cm49 is turned on. Through the window Wd2, the face of the sub block Sb5 is exposed. Accordingly, a user who views the head block M49 can recognize that the camera may capture an image. In a case where a rotated position of the sub block Sb6 is in a position shown in the right-hand side of FIG. 32, the position of the window Wd1 is moved and the lens of the character camera is shielded. Subsequently, the character camera Cm49 is turned off. In addition, the face of the sub block Sb5 is also shielded. Accordingly, the user can recognize that an image is not captured. Note that, it is also possible to switch on/off of the camera by means of a feature such as sliding or pressing of a sub block, not rotation of the sub block.

<6. Conclusion>

The embodiments according to the present disclosure have been explained in detail with reference to FIGS. 1 to 32. According to the above-described embodiment, an interaction event between a character and another character or a real object that exist in a real space is detected using an image captured by a camera, and an attribute value of each of the characters involved in the detected interaction event is changed in accordance with a dynamically set rule. According to such configuration, it is possible to flexibly change a battle condition. In this way, users in a wide age range can enjoy diverse battles.

Moreover, according to the above-described embodiments, an attack event becomes effective by an interaction between characters set to be in an adversarial relationship. Since the adversarial relationship between characters is dynamically set, a variety of battle conditions can be achieved. In addition, a character is damaged due to an interaction with a real object other than a friend character. According to such configuration, varied ways of attack such as an attack using goods or the body of a user that are not known to a system can be introduced in a battle. In this way, a battle under a rule that is not adopted based on a common sense or a battle in which a rule is ignored can be possible. As a result, such battle becomes attractive to a user in the earlier age group who does not understand the rules or a user who does not want to be a slave to common sense rules.

In addition, diverse events such as reduction or restoration of an attribute value based on an interaction between a character and an item known to the system may be introduced in a battle. Accordingly, variations of the battle conditions can be freely widened by including varied items in an item set. In addition, a character may be damaged by an accident such as a character falls. In this way, a collision with an obstacle, a strong wind, a field shaking, or the like that are phenomena treated as disturbance in general robot battle games can be introduced as an element of a game.

Moreover, according to the above-described embodiments, an interaction between a character and a user body making a certain gesture or a certain pose is excluded from the attack event. Accordingly, an operational request of a battle that the user can move a character for a purpose other than an attack can be satisfied.

Characters may be classified into an enemy and a friend on the basis of a gesture performed by each character or on the basis of an appearance feature of an accessory worn by each character. Accordingly users in any age croup can do a setting for an enemy or a friend by intuitively treating the characters.

In addition, according to the above-described embodiments, each character is formed by assembling modularized blocks. Moreover, an amount of change of an attribute value may be decided depending on a kind of a block involved in an interaction event. Accordingly, it is possible for a user to freely change a battle condition by changing assembly of the blocks. For example, the user can change ability of a character participating in a battle by replacing a weapon held by the character. It is also possible for the user to customize a battle field on the basis of his/her preference. In addition, it is also possible to separately sell a basic item set of the toy system and expansion blocks. Accordingly, the above-described embodiments are beneficial in flexible sales strategies by toy makers.

In addition, according to the above-described embodiments, in a case where an attribute value of a character has been changed, the character is driven so as to perform reaction related to the change of the attribute value. Accordingly, the user can get a feedback on a battle-progress status in a simple and visual manner without focusing on an output image. Furthermore, it is also possible to promote user empathy with a character.

In addition, according to the above-described embodiments, an AR image generated by overlaying an AR object on a captured image is provided to a user. By viewing such AR image, the user can understand the battle-progress situation more accurately, or can consider a more advanced battle plan. Moreover, entertainment properties of the battle can be improved by virtual accentuation, which is not performed in the real space, using an AR object.

The control processing described in the present specification may be realized by any one of software, hardware, and a combination of software and hardware. Programs included in the software are stored in advance, for example, in recording medium provided inside or outside of the respective apparatuses. Each program is read out, for example, by random access memory (RAM) when each program is executed, and executed by a processor such as a CPU.

Further, a part of the logical functions of the control module may be implemented on an apparatus which exists within a cloud computing environment.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)
An information processing apparatus including:
an attribute management unit configured to manage a variable attribute value associated with each one or more characters existing in a real space;
a detection unit configured to detect an interaction event between a first character and a real object by using an image captured by a camera that captures the real space; and
a setting unit configured to set a rule for changing the attribute value of the first character depending on the interaction event,
wherein, in a case where the detection unit has detected the interaction event, the attribute management unit changes the attribute value of the first character in accordance with the rule set by the setting unit.

(2)
The information processing apparatus according to (1),
wherein the attribute management unit decreases the attribute value of the first character or an enemy character depending on the interaction event between the first character and the enemy character set by the setting unit.

(3)
The information processing apparatus according to (1),
wherein the attribute management unit decreases the attribute value of the first character depending on the interaction event between the first character and a real object other than a friend character set by the setting unit.

(4)
The information processing apparatus according to any one of (1) to (3),
wherein the attribute management unit changes the attribute value of the first character depending on the interaction event between the first character and a known item shown in the captured image.

(5)
The information processing apparatus according to (4),
wherein the attribute management unit decreases the attribute value of the first character in a case where the item is a damage item, or the attribute management unit restores the attribute value of the first character in a case where the item is a healing item.

(6)
The information processing apparatus according to any one of (1) to (5),
wherein the real object includes a body of a user shown in the captured image, and
wherein the attribute management unit decreases the attribute value of the first character depending on the interaction event between the first character and the body of the user.

(7)
The information processing apparatus according to (6),
wherein the attribute management unit does not decrease the attribute value of the first character in a case where the body of the user makes a certain gesture or a certain pose.

(8)
The information processing apparatus according to any one of (1) to (7),
wherein the interaction event includes physical contact between the first character and the real object.

(9)
The information processing apparatus according to (8),
wherein each of the characters is formed by assembling modularized blocks, and wherein the attribute management unit decides an amount of change of the attribute value depending on a kind of a block involved in the interaction event.

(10)
The information processing apparatus according to (2), wherein the camera is provided on a housing of the enemy character, and
wherein the interaction event includes a remote-attack event that is detected when a certain user input is sensed in a state where the first character is shown in the captured image.

(11)
The information processing apparatus according to (10), wherein each of the characters is formed by assembling modularized blocks, and
wherein the remote-attack event is detected in a case where the enemy character includes a kind of a modularized block that is associated with the remote-attack event.

(12)
The information processing apparatus according to (2) or (3),
wherein the setting unit classifies each of the characters into an enemy character and a friend character on the basis of a gesture of each of the characters recognized using the captured image.

(13)
The information processing apparatus according to (2) or (3),
wherein each of the characters is formed by assembling modularized blocks, and
wherein the setting unit classifies each of the characters into an enemy character and a friend character on the basis of an appearance feature of each of the blocks included in each of the characters shown in the captured image.

(14)
The information processing apparatus according to any one of (1) to (13), further including:
a control unit configured to, in a case where the attribute value of the first character has been changed, drive the first character in a manner that the first character performs reaction related to the change.

(15)
The information processing apparatus according to any one of (1) to (14),
wherein the detection unit detects the interaction event by using the image captured by at least one of a character camera and a non-character camera, the character camera being provided on a housing of the character.

(16)
The information processing apparatus according to any one of (1) to (15), further including:
a display control unit configured to output an augmented reality image to a display, the augmented reality image being generated by overlaying an augmented reality object on the captured image.

(17)
The information processing apparatus according to any one of (1) to (16),
wherein the camera includes a mechanism for limiting image capturing of a real object that is not involved in a battle in which the one or more characters participate.

(18)
An information processing method executed by a computer that controls a system for a battle in which one or more characters existing in a real space participate, the method including:

setting a rule for changing a variable attribute value which is associated with a first character depending on an interaction event between the first character and a real object;
detecting the interaction event by using an image captured by a camera that captures the real space; and
changing the attribute value of the first character in accordance with the set rule in a case where the interaction event has been detected.

(19)
A program for causing a computer that controls a system for a battle in which one or more characters existing in a real space participate, to function as:
an attribute management unit configured to manage a variable attribute value associated with each of the one or more characters;
a detection unit configured to detect an interaction event between a first character and a real object by using an image captured by a camera that captures the real space; and
a setting unit configured to set a rule for changing the attribute value of the first character depending on the interaction event,
wherein, in a case where the detection unit has detected the interaction event, the attribute management unit changes the attribute value of the first character in accordance with the rule set by the setting unit.

(20)
A toy system including:
housings of one or more characters each of which is formed by assembling modularized blocks; and
a control module configured to manage a variable attribute value associated with each of the one or more characters,
wherein the control module detects an interaction event between a first character and a real object by using an image captured by a camera that captures a real space, and the control module changes the attribute value of the first character in accordance with a rule that is different depending on a kind of a modularized block involved in the interaction event.

REFERENCE SIGNS LIST

Ch1, Ch2, Ch3, Ch4 character
Fi1 field item
Ub1 user body
M01, M02, M03, M04 block
M11, M12, M13, M14 block
M21, M22, M23, M24 block
M31, M32, M33 block
M41, M42, M43, M44, M45, M46, M47, M48, M49 block
11 camera
100 information processing apparatus (control module)
102 camera
120 block DB
130 attribute DB
140 rule DB
150 setting unit
160 detection unit
170 attribute management unit
180 item control unit
190 display control unit

The invention claimed is:
1. An information processing apparatus, comprising:
one or more processors configured to:
manage a variable attribute value associated with each of
a plurality of characters that exist in a real space, wherein each of the plurality of characters comprises an assembly of first modularized blocks;

detect a first interaction event between a first character and a first real object based on an image captured by a camera configured to capture the real space, wherein the first interaction event includes a physical contact between the first character and the first real object;

set a rule to change the attribute value of the first character based on the first interaction event;

determine an amount of change of the attribute value of the first character based on a first kind of a first block from among the first modularized blocks involved in the first interaction event; and change the attribute value of the first character by the determined amount based on the set rule.

2. The information processing apparatus according to claim 1, wherein the one or more processors are further configured to:

detect a second interaction event between the first character and an enemy character; and decrease the attribute value of one of the first character or the enemy character based on the second interaction event between the first character and the enemy character.

3. The information processing apparatus according to claim 1, wherein the one or more processors are further configured to:

decrease the attribute value of the first character based on the first interaction event, and set a friend character other than the first real object.

4. The information processing apparatus according to claim 1, wherein the one or more processors are further configured to change the attribute value of the first character based on the first interaction event, wherein the first real object is a known item shown in the captured image.

5. The information processing apparatus according to claim 4, wherein the one or more processors are further configured to:

decrease the attribute value of the first character based on the known item that is a damage item; or restore the attribute value of the first character based on the known item that is a healing item.

6. The information processing apparatus according to claim 1, wherein the first real object includes a body of a user shown in the captured image, and wherein the one or more processors are further configured to decrease the attribute value of the first character based on the first interaction event between the first character and the body of the user.

7. The information processing apparatus according to claim 6, wherein the one or more processors are further configured to prevent the attribute value of the first character to decrease based on a certain gesture or a certain pose of the body of the user.

8. The information processing apparatus according to claim 2, wherein the one or more processors are further configured to classify each of the plurality of characters into one of an enemy character class or a friend character class based on a gesture of each of the plurality of characters, wherein the gesture of each of the plurality of characters is recognized based on the captured image.

9. The information processing apparatus according to claim 2, wherein the one or more processors are further configured to classify each of the plurality of characters into one of an enemy character class or a friend character class based on an appearance feature of each of the first modularized blocks included in each of the plurality of characters shown in the captured image.

10. The information processing apparatus according to claim 1, wherein based on the change in the attribute value of the first character by the determined amount, the one or more processors are further configured to drive the first character in a manner that corresponds to the change in the attribute value.

11. The information processing apparatus according to claim 1, wherein the image is captured by one of a character camera or a non-character camera, and wherein the first character comprises a housing that includes the character camera.

12. The information processing apparatus according to claim 1, wherein the one or more processors are further configured to output an augmented reality image to a display, wherein the augmented reality image is generated by an augmented reality object that is overlaid on the captured image.

13. The information processing apparatus according to claim 1, wherein the camera includes a mechanism configured to limit image capture of a second real object that is in addition to third objects that are related to a battle in which the plurality of characters participate.

14. An information processing method, comprising:

detecting an interaction event between a first character from among a plurality of characters and a real object based on an image captured by a camera configured to capture a real space, wherein the plurality of characters exist in the real space, and wherein the first character comprises an assembly of modularized blocks;

setting a rule for changing a variable attribute value associated with the first character based on the interaction event between the first character and the real object;

determining an amount of change of the attribute value of the first character based on a kind of a block from among the modularized blocks involved in the interaction event; and changing the attribute value of the first character by the determined amount based on the set rule.

15. An information processing apparatus, comprising:

one or more processors configured to:

manage a variable attribute value associated with each of a plurality of characters that exist in a real space;

detect an interaction event between a first character that comprises an assembly of modularized blocks and a real object based on an image captured by a camera configured to capture the real space;

set a rule to change the attribute value of the first character based on the interaction event;

determine an amount of change of the attribute value based on a kind of a block from among the modularized blocks involved in the interaction event; and change the attribute value of the first character by the determined amount based on the set rule.

16. An information processing system comprising:
one or more processors configured to:
acquire an image of a real space captured by a camera;
manage an attribute data associated with a combination of a plurality of objects in a database;
determine a kind of at least one object among the plurality of objects based on the acquired image;
determine a physical interaction event between the combination of the plurality of objects and a real object based on the acquired image; and
change the attribute data of the plurality of objects based on the kind of the at least one object and a rule associated with the physical interaction event.

17. The information processing system according to claim 16,
wherein the real object includes an actuator and is configured to move autonomously, and
wherein the one or more processors are further configured to:
determine the physical interaction event between the combination of the plurality of objects and the real object based on an action of the real object moved autonomously with the actuator; and
change the attribute data of the plurality of objects based on the action of the real object.

18. The information processing system according to claim 16,
wherein the real object is one of a base object or a floor of the real space, and
wherein the one or more processors are further configured to:
determine an accident event, as the physical interaction event, that the combination of the plurality of objects falls on the real object; and
change the attribute data of the plurality of objects based on the determined accident event.

19. The information processing system according to claim 16,
wherein the combination of the plurality of objects are arranged on the real object, and
wherein the one or more processors are further configured to:
determine the physical interaction event as the arrangement of the combination of the plurality of objects on the real object; and
change the attribute data of the plurality of objects based on the real object.

20. An information processing apparatus, comprising:
one or more processors configured to:
manage a variable attribute value associated with each of a plurality of characters that exist in a real space, wherein each of the plurality of characters comprises an assembly of modularized blocks;
detect a interaction event between a first character and a real object based on an image captured by a camera configured to capture the real space;
detect a remote-attack event between the first character and an enemy character based on:
a user input that is sensed in a state where the first character is shown in the image captured by the camera; and
the enemy character that includes a kind of a block from among the modularized blocks associated with the remote attack event,
wherein the enemy character comprises a housing that includes the camera;
set a rule to change the attribute value of the first character based on the interaction event;
change the attribute value of the first character based on the set rule; and
decrease the attribute value of the first character or the enemy character based on the remote-attack event between the first character and the enemy character.

* * * * *